(12) United States Patent
Matsubayashi et al.

(10) Patent No.: US 8,018,611 B2
(45) Date of Patent: Sep. 13, 2011

(54) CLASSIFICATION INFORMATION SETTING METHOD, AND TELEVISION

(75) Inventors: Kazuhiro Matsubayashi, Yokohama (JP); Yoshikazu Shibamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1186 days.

(21) Appl. No.: 11/047,735

(22) Filed: Feb. 2, 2005

(65) Prior Publication Data
US 2005/0169685 A1 Aug. 4, 2005

(30) Foreign Application Priority Data

Feb. 4, 2004 (JP) ................................. 2004-027809
Jan. 26, 2005 (JP) ................................. 2005-018117

(51) Int. Cl.
*G06F 3/12* (2006.01)
*G06G 3/00* (2006.01)

(52) U.S. Cl. ......... 358/1.15; 358/1.9; 358/1.13; 725/45; 725/61

(58) Field of Classification Search .................. 348/563; 400/62; 725/37–61; 365/68; 707/7; 358/1.13
See application file for complete search history.

(56) References Cited

U.S. PATENT DOCUMENTS

| | | | | |
|---|---|---|---|---|
| 5,552,833 A * | 9/1996 | Henmi et al. | ................. | 348/460 |
| 6,301,586 B1 * | 10/2001 | Yang et al. | ............................. | 1/1 |
| 6,373,504 B1 * | 4/2002 | Nielsen | .......................... | 715/739 |
| 6,614,987 B1 * | 9/2003 | Ismail et al. | ..................... | 386/83 |
| 6,774,951 B2 * | 8/2004 | Narushima | .................... | 348/552 |
| 7,073,188 B2 * | 7/2006 | Lemmons et al. | .............. | 725/47 |
| 7,139,090 B2 * | 11/2006 | Ihara et al. | .................... | 358/1.15 |
| 7,218,407 B1 * | 5/2007 | Ihara | ............................. | 358/1.15 |
| 7,225,397 B2 | 5/2007 | Fukuda et al. | | |
| 7,367,043 B2 * | 4/2008 | Dudkiewicz et al. | ......... | 725/138 |
| 7,380,206 B1 * | 5/2008 | Usuda | ........................... | 715/236 |
| 7,385,719 B2 * | 6/2008 | Ohno et al. | .................... | 358/1.15 |
| 2002/0067376 A1 * | 6/2002 | Martin et al. | ................. | 345/810 |
| 2002/0171872 A1 | 11/2002 | Matsunaga | .................... | 358/1.18 |
| 2003/0192047 A1 * | 10/2003 | Gaul et al. | ..................... | 725/39 |
| 2004/0103436 A1 * | 5/2004 | Shikata et al. | .................. | 725/83 |
| 2004/0117831 A1 * | 6/2004 | Ellis et al. | ........................ | 725/53 |
| 2004/0136244 A1 * | 7/2004 | Nakamura et al. | ............ | 365/200 |
| 2005/0158100 A1 * | 7/2005 | Yamaguchi et al. | ........... | 400/62 |
| 2005/0160462 A1 | 7/2005 | Shikata et al. | .................. | 725/58 |
| 2005/0289593 A1 * | 12/2005 | Spilo | ............................... | 725/45 |
| 2007/0291292 A1 * | 12/2007 | Nakabayashi et al. | ......... | 358/1.9 |

FOREIGN PATENT DOCUMENTS

| | | |
|---|---|---|
| EP | 1100269 A1 * | 5/2001 |
| JP | 09-282472 | 10/1997 |
| JP | 10-164521 | 6/1998 |
| JP | 2002-245068 A | 8/2002 |
| JP | 2002-292941 | 10/2002 |
| JP | 2002-297631 A | 10/2002 |
| JP | 2003-37812 | 2/2003 |

* cited by examiner

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

A classification information setting method for classifying contents into series comprises: a similarity determination step for determining a similarity between first contents classified into a series and second contents unclassified yet; and a classification setting step for setting, in case the similarity exists, classification information related to the first contents, as classification information for the second contents. At the similarity determination step, the similarity is determined by comparing text data contained in the first contents and text data contained in the second contents.

2 Claims, 43 Drawing Sheets

| PRINTING DATE/ HOUR AND PROGRAM TITLE | PRINTING CONTENTS | PRINTING MODE |
|---|---|---|
| (I) APRIL 1 (SAT.) 8:00 JOYFUL TRIP | NIHONBASHI | PAPER SIZE: L-SIZE PAPER KIND: PHOTO PAPER DIRECTION: TRANSVERSE IMAGE QUALITY: HIGH SYNTHESIS: FRAME |
| (II) APRIL 1 (SAT.) 8:30 JOYFUL TRIP | MAP OF NIHONBASHI | PAPER SIZE: A4 PAPER KIND: PLAIN PAPER DIRECTION: LONGITUDINAL IMAGE QUALITY: HIGH SPEED SYNTHESIS: NO |
| (III) APRIL 8 (SAT.) 8:00 JOYFUL TRIP | KANAGAWA JUKU | PAPER SIZE: L-SIZE PAPER KIND: PHOTO PAPER DIRECTION: TRANSVERSE IMAGE QUALITY: HIGH SYNTHESIS: FRAME |
| (IV) APRIL 10 (MON.) 9:00 DELICIOUS DISHES | DELICIOUS DISH CUT MIX FRY DISH | PAPER SIZE: A4 PAPER KIND: PLAIN PAPER DIRECTION: LONGITUDINAL IMAGE QUALITY: HIGH SYNTHESIS: NO |
| (V) APRIL 15 (SAT.) 8:00 JOYFUL TRIP | HIRATSUKA JUKU | PAPER SIZE: L-SIZE PAPER KIND: PHOTO PAPER DIRECTION: TRANSVERSE IMAGE QUALITY: HIGH SYNTHESIS: FRAME |

FIG.12

| | PRINTING DATE/HOUR AND PROGRAM TITLE | PRINTING CONTENTS | PRINTING MODE |
|---|---|---|---|
| (I) | APRIL 1(SAT.) 8:00 JOYFUL TRIP |  NIHONBASHI | PAPER SIZE: L-SIZE<br>PAPER KIND: PHOTO PAPER<br>DIRECTION: TRANSVERSE<br>IMAGE QUALITY: HIGH<br>SYNTHESIS: FRAME |
| (II) | APRIL 1(SAT.) 8:30 JOYFUL TRIP | MAP OF NIHONBASHI 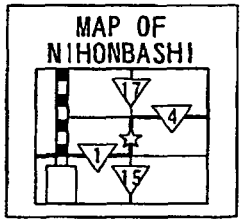 | PAPER SIZE: A4<br>PAPER KIND: PLAIN PAPER<br>DIRECTION: LONGITUDINAL<br>IMAGE QUALITY: HIGH SPEED<br>SYNTHESIS: NO |
| (III) | APRIL 8(SAT.) 8:00 JOYFUL TRIP | 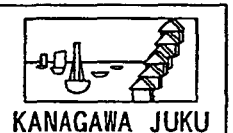 KANAGAWA JUKU | PAPER SIZE: L-SIZE<br>PAPER KIND: PHOTO PAPER<br>DIRECTION: TRANSVERSE<br>IMAGE QUALITY: HIGH<br>SYNTHESIS: FRAME |
| (IV) | APRIL 10(MON.) 9:00 DELICIOUS DISHES | DELICIOUS DISH 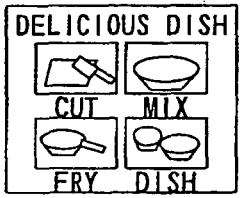 CUT MIX FRY DISH | PAPER SIZE: A4<br>PAPER KIND: PLAIN PAPER<br>DIRECTION: LONGITUDINAL<br>IMAGE QUALITY: HIGH<br>SYNTHESIS: NO |
| (V) | APRIL 15(SAT.) 8:00 JOYFUL TRIP |  HIRATSUKA JUKU | PAPER SIZE: L-SIZE<br>PAPER KIND: PHOTO PAPER<br>DIRECTION: TRANSVERSE<br>IMAGE QUALITY: HIGH<br>SYNTHESIS: FRAME |

FIG. 13

```
FILE NAME: nihonbashi.html

<?xml version="1.0" encoding ="Shift_JIS"?>
<!DOCTYPE html
     PUBLIC "-//W3C//DTD XHTML 1.0 Strict//EN"
     "http://www.w3.org/TR/xhtml1/DTD/xhtml1-strict.dtd">
<html xmlns="http://www.w3.org/1999/xhtml1" xml:lang="ja" lang="ja">
<head>
<title>JOYFUL TRIP:PHOTO </title>
<link rel="stylesheet" type="text/css" href="travel.css" />
</head>
<body>
<div id="printarea">
<object id="picture" type="image/jpeg" data="nihonbashi.jpg" />
<p id="place">
NIHONBASHI
</p>
</div>
</body>
</html>
```

FIG. 14

```
FILE NAME : travel.css

@media print{
 @page {size:148mm 100mm} printarea{position:absolute;
            left:10mm; top:10mm; width:120mm; height:80mm;} picture{position:absolute;
          left:10mm; top:0mm; width:100mm; height:70mm;} place{position:absolute;
        left:0mm; top:70mm; width:120mm; height:10mm;}
        text-align:center; color:#ff9900;
        font-family:sans-serif; font-size:24pt; font-weight:bold;}
```

FIG. 15

```
FILE NAME : nihonbashimap.html
```

```
<?xml version="1.0" encoding="Shift_JIS"?>
<!DOCTYPE html
      PUBLIC "-//W3C//DTD XHTML 1.0 Strict//EN"
      "http://www.w3.org/TR/xhtml1/DTD/xhtml1-strict.dtd">
<html xmlns="http://www.w3.org/1999/xhtml" xml:lang="ja" lang="ja">
<head>
<title>JOYFUL TRIP:MAP</title>
<link rel="stylesheet" type="text/css" href="map.css" />
</head>
<body>
<div id="printarea">
<p id="town">
NIHONBASHI
</p>
<object id="map" type="image/png" data="nihonbashimap.png" />
</div>
</body>
</html>
```

FIG. 16

```
FILE NAME :map.css

@media print {
  @page {size:210mm 297mm} printarea {position:absolute;
              left:10mm; top:10mm; width:190mm; height:280mm;} town {position:absolute;
         left:0mm; top:0mm; width:190mm; height:10mm;}
         text-align:center; color:black;
         font-family:sans-serif; font-size:36pt; font-weight:bold;} map {position:absolute;
        left:0mm; top:10mm; width:190mm; height:270mm;}
}
```

FIG. 17

```
FILE NAME : kanagawa.html
```

```
<?xml version="1.0" encoding="Shift_JIS"?>
<!DOCTYPE html
        PUBLIC "-//W3C//DTD XHTML 1.0 Strict//EN"
        "http://www.w3.org/TR/xhtml1/DTD/xhtml1-strict.dtd">
<html xmlns="http://www.w3.org/1999/xhtml" xml:lang="ja" lang="ja">
<head>
<title>JOYFUL TRIP:PHOTO </title>
<link rel="stylesheet" type="text/css" href="travel.css" />
</head>
<body>
<div id="printarea">
<object id="picture" type="image/jpeg" data="kanagawa.jpg" />
<p id="place">
KANAGAWA JUKU
</p>
</div>
</body>
</html>
```

FIG. 24
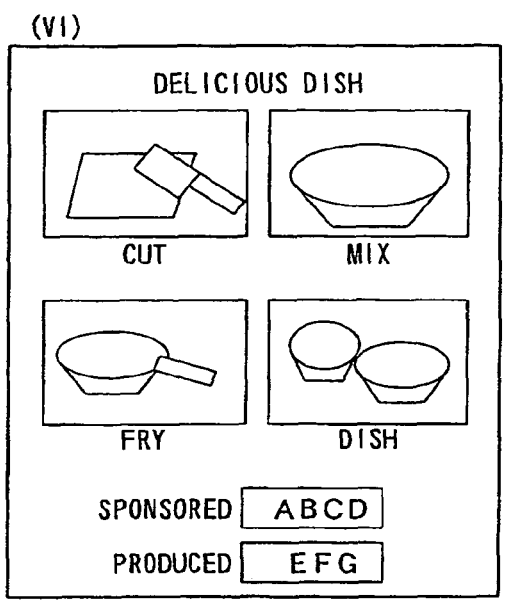
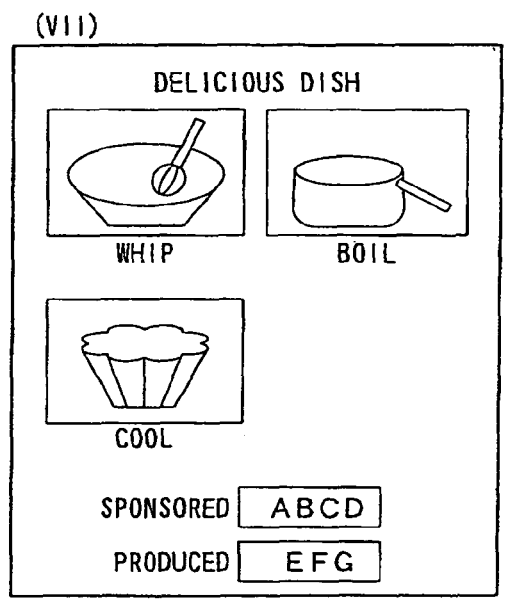

FIG. 25

FILE NAME : fry.html

```
<?xml version="1.0" encoding="Shift_JIS"?>
<!DOCTYPE html
    PUBLIC "-//W3C//DTD XHTML 1.0 Strict//EN"
    "http://www.w3.org/TR/xhtml1/DTD/xhtml1-strict.dtd">
<html xmlns="http://www.w3.org/1999/xhtml" xml:lang="ja" lang="ja">
<head>
<title>RECIPE</title>
<link rel="stylesheet" type="text/css" href="travel.css" />
</head>
<body>
<p id="program">DELICIOUS DISH</p>
<div id="process1">
<object class="photo" type="image/jpeg" data="cut.jpg" />
<p>CUT</p>
</div>
<div id="process2">
<object class="photo" type="image/jpeg" data="mix.jpg" />
<p>MIX</p>
</div>
<div id="process3">
<object class="photo" type="image/jpeg" data="fry.jpg" />
<p>FRY</p>
</div>
<div id="process4">
<object class="photo" type="image/jpeg" data="serve.jpg" />
<p>DISH</p>
</div>
<p id="sponsor">
SPONSORED
<object class="logo" type="image/png" data="abcd.png" />
</p>
<p id="broadcaster">
PRODUCED
<object class="logo" type="image/png" data="efg.png" />
</p>
</body>
</html>
```

FIG. 26

FILE NAME : dessert.html

```xml
<?xml version="1.0" encoding ="Shift_JIS"?>
<!DOCTYPE html
    PUBLIC " -// W3C // DTD XHTML 1.0 Strict // EN"
    "http://www.w3.org/TR/xhtml1/DTD/xhtml1-strict.dtd">
<html xmlns ="http://www.w3.org/1999/xhtml1" xml:lang="ja" lang="ja">
<head>
<title>RECIPE</title>
<link rel="stylesheet" type="text/css" href="travel.css" />
</head>
<body>
<p id="program">DELICIOUS DISH</p>
<div id="process1">
<object class="photo" type="image/jpeg" data="whip.jpg" />
<p>WHIP</p>
</div>
<div id="process2">
<object class="photo" type="image/jpeg" data="boil.jpg" />
<p>BOIL</p>
</div>
<div id="process3">
<object class="photo" type="image/jpeg" data="cool.jpg" />
<p>COOL</p>
</div>
<p id="sponsor">
SPONSORED
<object class="logo" type="image/png" data="abcd.png" />
</p>
<p id="broadcaster">
PRODUCED
<object class="logo" type="image/png" data="efg.png" />
</p>
</body>
</html>
```

FIG. 28
(a) 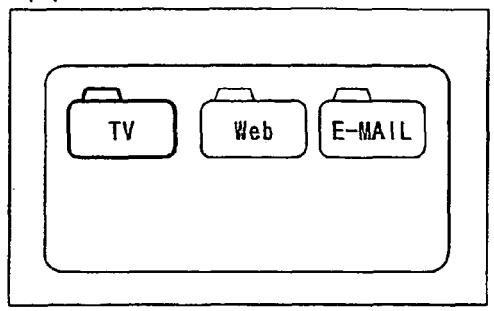
(b) 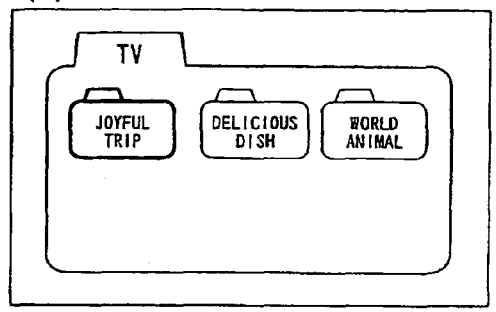
(c) 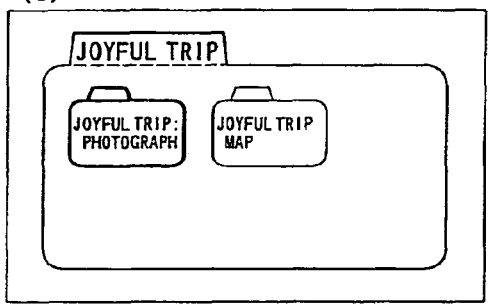
(d) 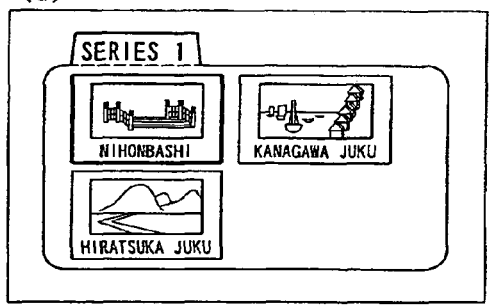
(e) 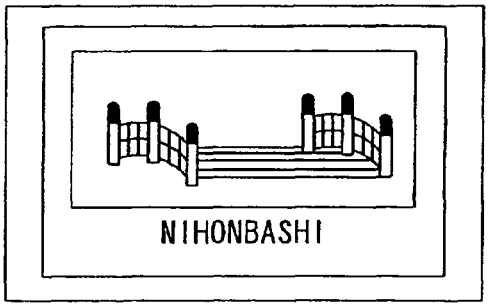

FIG. 30
(a)
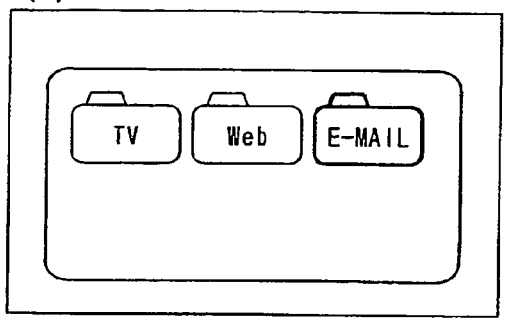
(b)
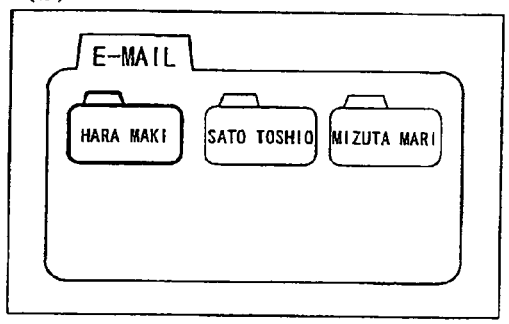
(c)
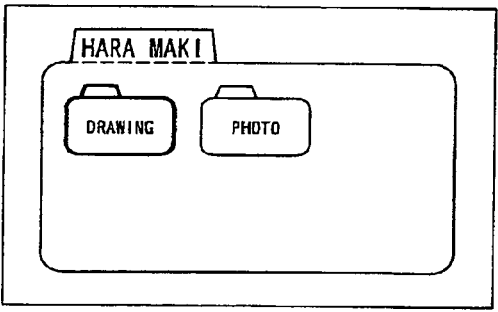
(d)
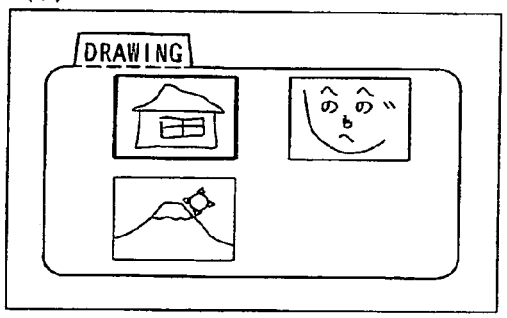
(e)
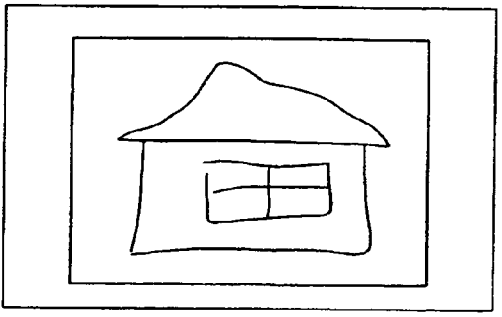

FIG.35

SERIES DESCRIPTOR

| DESCRIPTOR TAG '0xD5' | DESCRIPTOR LENGTH | SERIES ID | REPEAT LABEL | PROGRAM PATTERN | EXPIRE DATE VALID FLAG | EXPIRE DATE | EPISODE NO. | LAST EPISODE NO. | SERIES NAME (CHARACTER CODE) |
|---|---|---|---|---|---|---|---|---|---|
| 8 | 8 | 16 | 4 | 3 | 1 | 16 | 12 | 12 | 8×N |

BIT NO.

FIG. 37

SETTING OF PRINTING MODE

PROGRAM TITLE: JOYFUL TRIP

| NO. | PAPER SIZE | PAPER KIND | DIRECTION | IMAGE QUALITY | SYNTHESIS |
|---|---|---|---|---|---|
| 1:NEW | A4 | PLAIN PAPER | LONGITUDINAL | HIGH QUALITY | NO |
| | POSTCARD | PHOTO PAPER | TRANSVERSE | STANDARD | DATE |
| | L-SIZE | INK JET POSTCARD | | HIGH SPEED | FRAME |

SELECT ITEM WITH ←→ KEY
SELECT IMAGE QUALITY WITH ↑↓ KEY
START PRINT WITH DECIDE KEY

FIG. 39

SETTING OF PRINTING MODE

PROGRAM TITLE: JOYFUL TRIP

| NO. | PAPER SIZE | PAPER KIND | DIRECTION | IMAGE QUALITY | SYNTHESIS |
|---|---|---|---|---|---|
| 1 | A4 | PLAIN PAPER | LONGITUDINAL | HIGH QUALITY | NO |
| | POSTCARD | PHOTO PAPER | TRANSVERSE | STANDARD | DATE |
| | L-SIZE | INK JET POSTCARD | | HIGH SPEED | FRAME |

SELECT ITEM WITH ←→ KEY
SELECT IMAGE QUALITY WITH ↑↓ KEY
START PRINT WITH DECIDE KEY

FIG.43

SHORT TYPE EVENT DESCRIPTOR

| DESCRI-PTOR TAG '0x4D' | DESCRI-PTOR LENGTH | LANGUAGE CODE | EVENT NAME LENGTH | EVENT NAME (CHARACTER CODE) | EVENT DESCRIPTION LENGTH | EVENT DESCRIPTION (CHARACTER CODE) |
|---|---|---|---|---|---|---|
| 8 | 8 | 24 | 8 | 8×N | 8 | 8×N |

BIT NO.

CLASSIFICATION INFORMATION SETTING METHOD, AND TELEVISION

BACKGROUND OF THE INVENTION

1. Field of the Invention

The present invention relates to a technique for classifying contents.

2. Description of the Related Art

There have begun to spread digital broadcasts, which can multiplex data broadcast in addition to data of time-varying images and voices. Digital televisions supporting such digital broadcasts not only can enjoy the programs but can also peruse or store its contents (e.g., information such as map information, a good catalogue or recipe) provided by data broadcast. There has also been proposed a technique for printing those contents by connecting a printer with a digital television.

In case a printing instruction is made from a television, it is necessary for the related art to set various printing modes (or printing conditions) such as paper sizes, paper kinds, printing directions and image qualities for the contents (as will be merely called the "printing contents") to be printed, on a control panel displayed. This setting operation is substantially similar to an operation of the casein which the print is instructed from a personal computer.

A technique for lightening a load required for an operation to set printing modes has been disclosed in JP-A-2002-292941 and JP-A-9-282472. In JP-A-2002-292941, specifically, there is provided an image processing apparatus for setting the optimum printing condition automatically by analyzing the recorded information of individual image data stored in an image storage unit, to change and set the printing conditions for the individual image data thereby to execute a predetermined image processing. In JP-A-9-282472, on the other hand, there is disclosed a method, in which a page describing language is analyzed for each line to decide the attributes of an image (i.e., to determine the images of photographs/characters) so that the image processing is accordingly executed. Here, either of the disclosures is a technique which is applied when the image data are outputted from personal computers.

Generally, inputting operations of televisions have to be performed by a remote control. Then, the input/select operations are preferred to be less for classifying/retrieving the printing contents or for setting the printing mode. This is because it is complicated and takes a long time to input characters or the like with limited keys of the remote control.

In case the printing operation is done with a television, moreover, there arises a problem that it obstructs the enjoyment of a TV program to display an operation panel thoughtlessly on the screen.

SUMMARY OF THE INVENTION

The present invention has been conceived in view of the background thus far described and has an object to provide a technique capable of classifying contents efficiently.

Another object of the invention is to provide a technique capable of setting printing modes efficiently for contents.

In the invention for achieving the aforementioned objects, the printing contents are classified by the following means or processes.

According to a first mode of the invention, there is provided a classification information setting method for classifying contents into series, comprising: a similarity determination step for determining a similarity between first contents classified into a series and second contents unclassified yet; and a classification setting step for setting, in case the similarity exists, classification information related to the first contents, as classification information for the second contents, wherein at the similarity determination step, the similarity is determined by comparing text data contained in the first contents and text data contained in the second contents.

According to a second mode of the invention, there is provided a television apparatus comprising a classification unit for classifying contents inputted to the television apparatus, into series, wherein the classification unit: determines a similarity between first contents classified into a series and second contents unclassified yet by comparing text data contained in the first contents and text data contained in the second contents; and sets, in case the similarity exists, classification information related to the first contents, as classification information of the second contents.

According to a third mode of the invention, there is provided a television apparatus comprising: a classification unit that classifies printing contents contained in a TV program into series; a storage unit that stores printing modes corresponding to each series; and a setting unit that sets a printing mode corresponding to the series into which printing contents are classified, to a printing mode of the printing contents.

According to a fourth mode of the invention, there is provided a printing mode setting method for setting a printing mode for printing contents contained in a TV program, comprising: the step of storing printing modes corresponding to each series of printing contents; the step of classifying printing contents contained in a TV program, into a series; and the step of setting a printing mode corresponding to the series into which printing contents are classified, to the printing contents.

According to a fifth mode of the invention, there is provided a program for classifying contents into series, comprising: a similarity determination step for determining a similarity between first contents classified into a series and second contents unclassified yet; and a classification setting step for setting, in case the similarity exists, classification information related to the first contents, as classification information of the second contents, wherein at the similarity determination step, the similarity is determined by comparing text data contained in the first contents and text data contained in the second contents.

According to a sixth mode of the invention, there is provided a program for setting a printing mode for printing contents contained in a TV program, comprising: the step of storing printing modes corresponding to each series of printing contents; the step of classifying the printing contents contained in the TV program, into the series; and the step of setting a printing mode corresponding to the series into which printing contents are classified, to the printing contents.

BRIEF DESCRIPTION OF THE DRAWINGS

FIG. 12 is a diagram presenting printing dates/hours, program names, contents and printing modes of each printing contents;

FIG. 13 presents one example of an XHTML file contained in the printing contents;

FIG. 14 presents one example of a CSS file contained in the printing contents;

FIG. 15 presents one example of the XHTML file contained in the printing contents;

FIG. 16 presents one example of the CSS file contained in the printing contents;

FIG. 17 presents one example of the XHTML file contained in the printing contents;

FIG. 24 presents an example of a printed result;

FIG. 25 presents one example of an XHTML file contained in the printing contents;

FIG. 26 presents one example of an XHTML file contained in the printing contents;

FIG. 28, including FIGS. 28(a)-28(e), presents a screen example displayed in classification folders;

FIGS. 29(a)-29(e), presents a screen example displayed in classification folders;

FIG. 30, including FIGS. 30(a)-30(e), presents a screen example displayed in classification folders;

FIGS. 31(a)-31(f), presents a screen example displayed in classification folders;

FIG. 35 presents a data structure of a series descriptor of an SI;

FIG. 37 presents a printing mode setting screen;

FIG. 39 presents a printing mode setting screen;

FIG. 43 presents a data structure of a short type event descriptor of the SI.

DESCRIPTION OF THE PREFERRED EMBODIMENTS

The preferred embodiments of the invention will be illustratively described in detail with reference to the accompanying drawings.

[Print Processing System]

Figure 1:
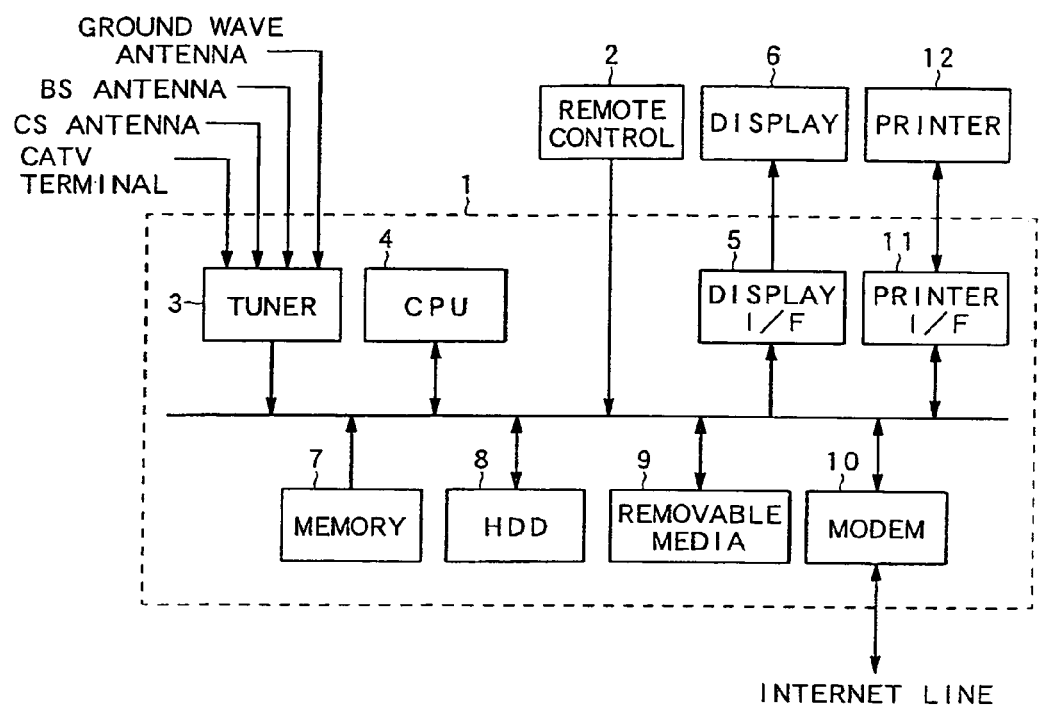
FIG. 1 is a block diagram showing a schematic configuration of the hardware of a print processing system.

FIG. 1 is a block diagram showing a schematic configuration of the hardware of a print processing system, to which the invention is applied. This print processing system includes a digital TV receiver 1 and a printer (or an image forming device) 12, and has a function to print printing contents inputted to the digital TV receiver 1, with the printer 12.

In FIG. 1, the TV receiver 1 is a unit for inputting/outputting, processing, storing and communicating data. The TV receiver 1 can be connected with various antennas, a CATV terminal, a remote control, a display, a printer, an internet line and so on.

When a user selects a channel with a remote control 2, received data of a desired channel can be obtained through a tuner 3 from signals inputted from the antenna or the CATV terminal. The received data of one channel of the digital TV have time-varying data, audio data and other code data multiplexed. A CPU (Central Processing Unit) 4 separates those data, performs decoding or other processes, and outputs images or voices through a display I/F 5 to a display 6.

The received data or the data obtained by the various processes can be temporarily stored in a memory 7, recorded in a HDD (Hard Disk Drive) 8 and a removable media 9 (e.g., a video tape or a vide disk) and in the server of the internet through a modem 10, and printed by the printer 12 through a printer I/F 11.

The functions and processes to be described in detail are realized mainly such that the CPU 4 executes the control programs stored in the memory 7 and the HDD 8.

As another example of a hardware configuration, there can be conceived a configuration, in which the display or the printer and the receiver are integrated, or a configuration which includes a personal computer, a board having the functions of a receiver, and a software program.

Figure 2:
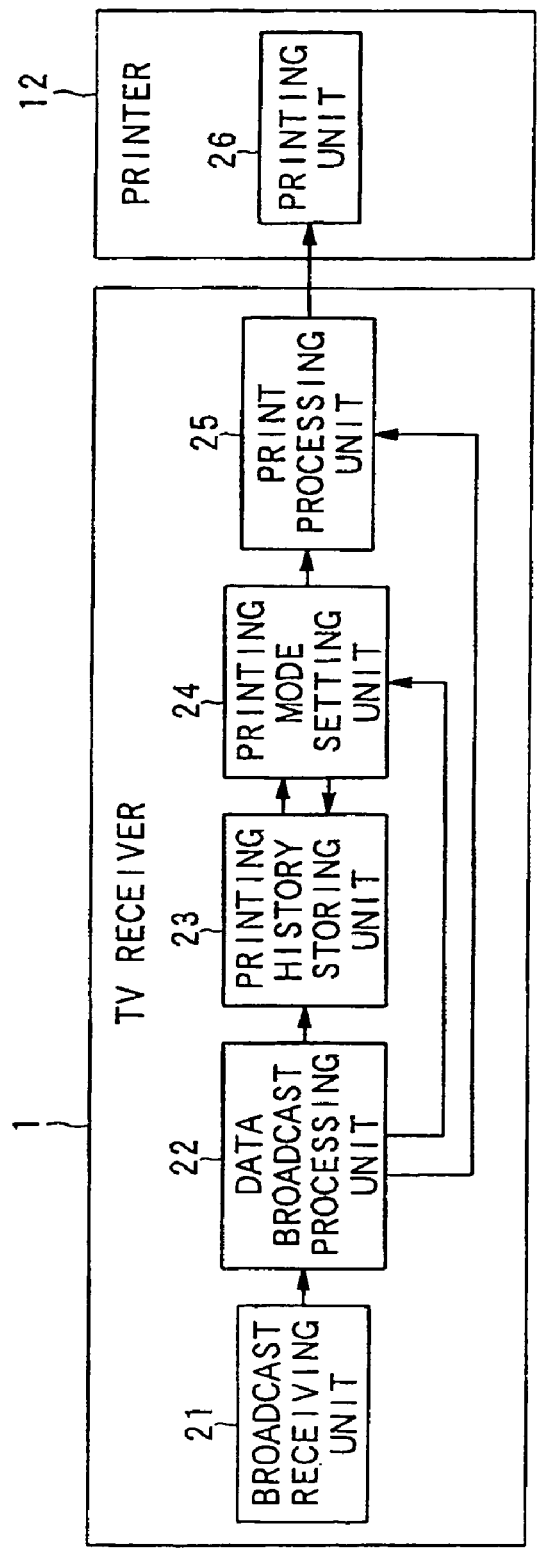
FIG. 2 is a functional block diagram showing a functional configuration of the print processing system.
Figure 3:
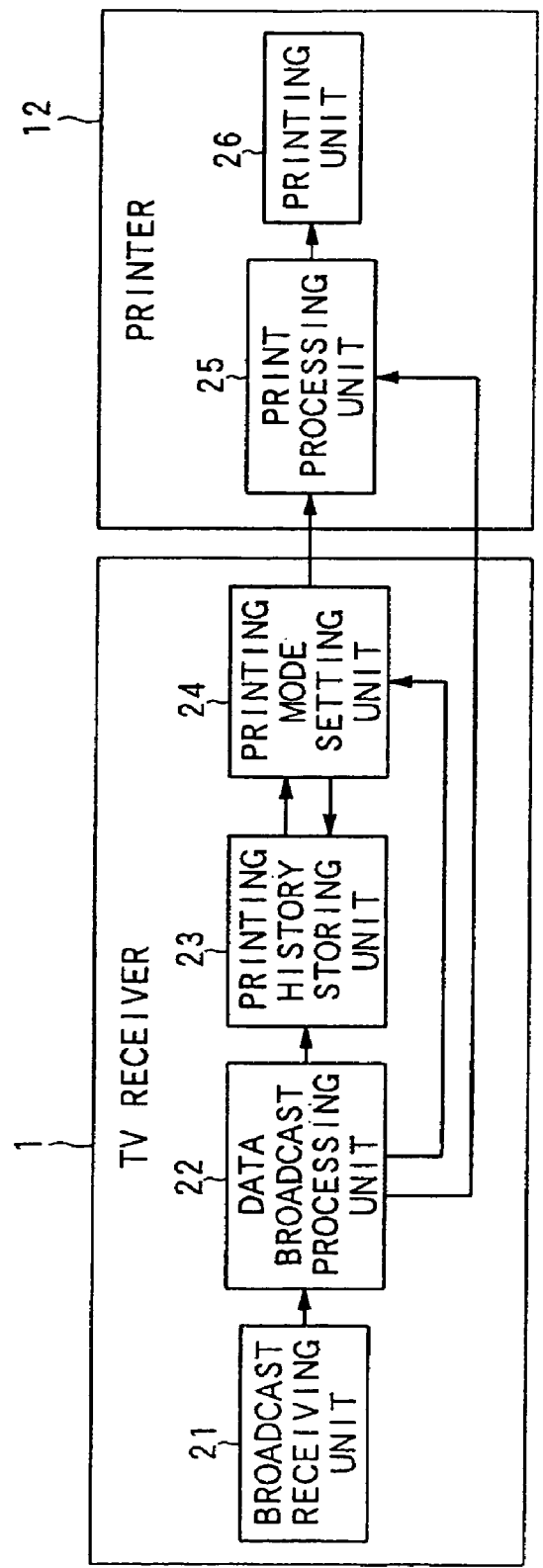
FIG. 3 is a functional block diagram showing a functional configuration of the print processing system.
Figure 4:
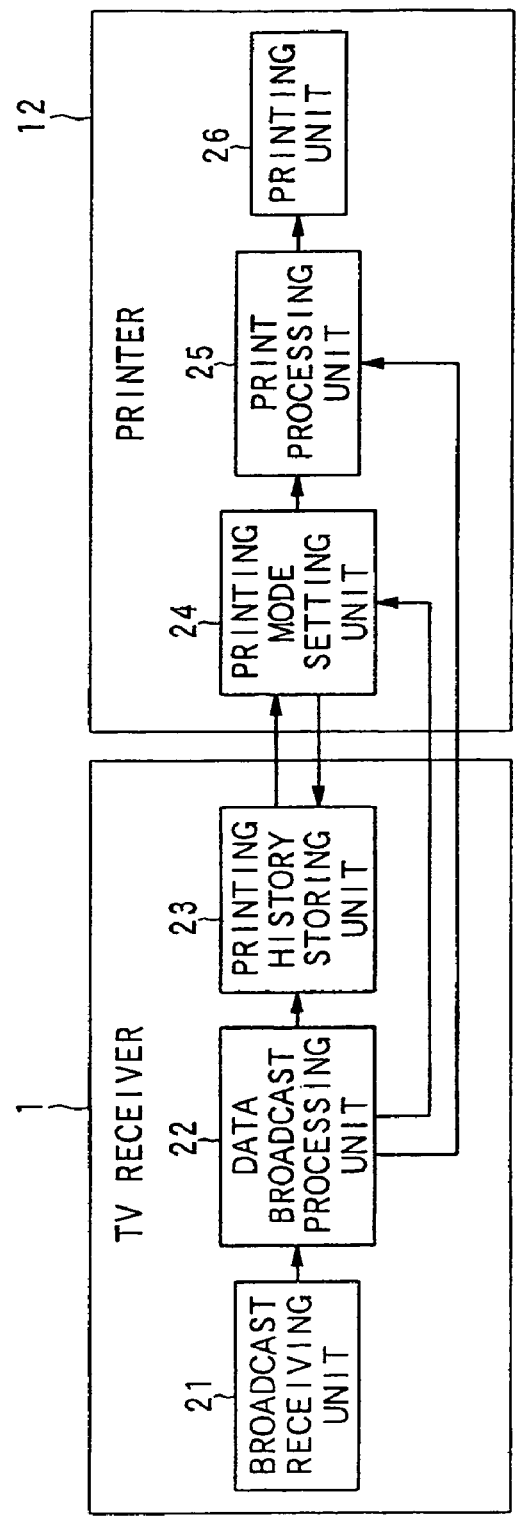
FIG. 4 is a functional block diagram showing a functional configuration of the print processing system.
Figure 5:
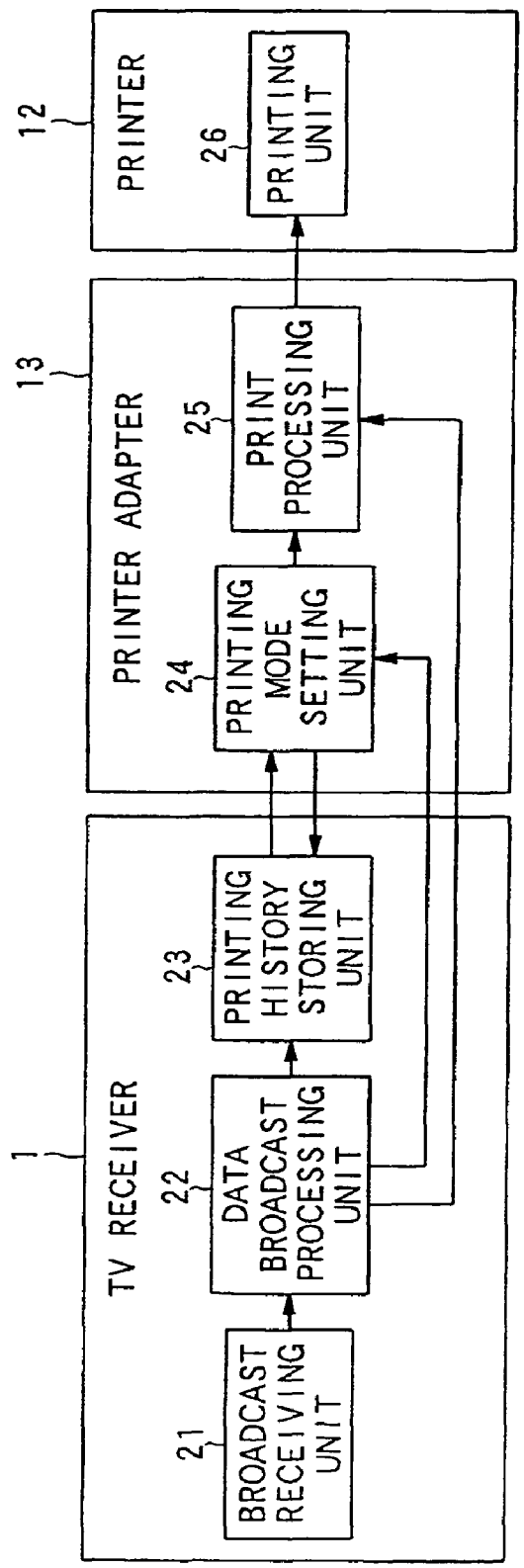
FIG. 5 is a functional block diagram showing a functional configuration of the print processing system.
Figure 6:
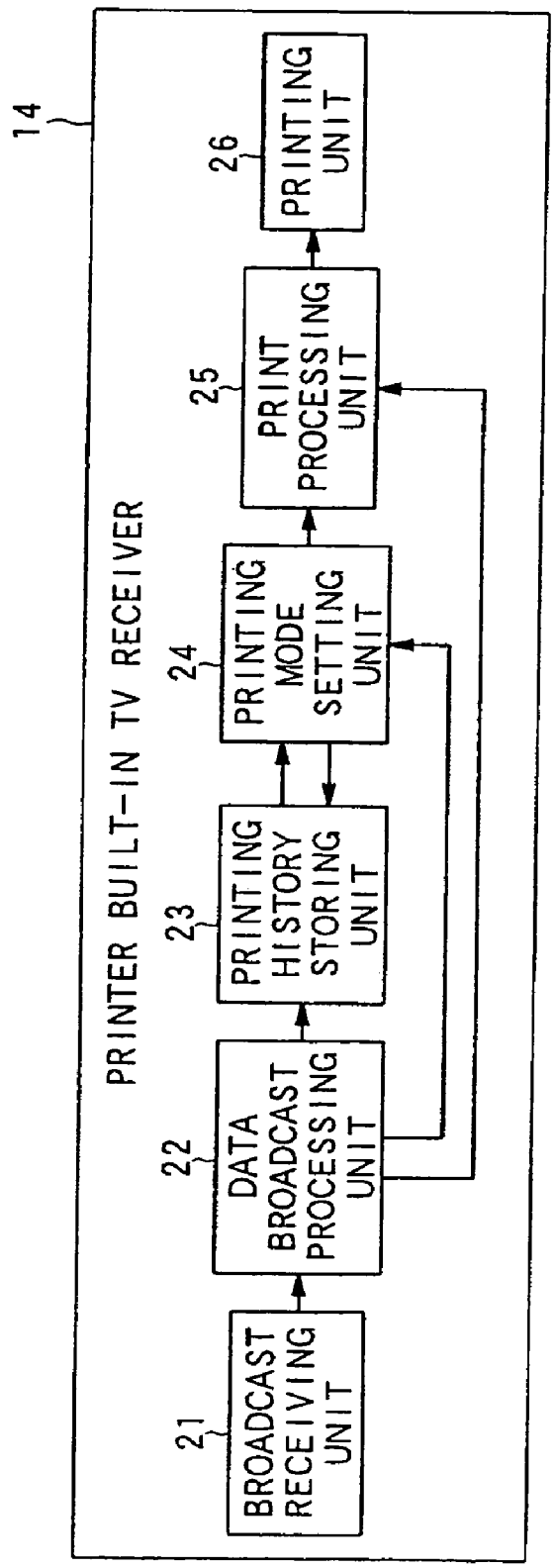
FIG. 6 is a functional block diagram showing a functional configuration of the print processing system.

Functional block diagrams of FIG. 2, FIG. 3, FIG. 4, FIG. 5 and FIG. 6 present examples of variations of the functional configuration of the print processing system. In the configurations of FIG. 2, FIG. 3 and FIG. 4, the output signals of the TV receiver 1 are inputted directly to the printer 12. In the configuration of FIG. 5, the output signals of the TV receiver 1 are processed by a printer adapter 13 and then inputted to the printer 12. In FIG. 6, the TV receiver and the printer are integrated into a printer built-in TV receiver 14.

This system has the functions of: a broadcast receiving unit 21 for receiving digital broadcasts; a data broadcast processing unit 22 for analyzing data broadcast contained in digital broadcasts; a printing history storing unit 23 for storing and managing classification information of printing contents; a printing mode setting unit 24 for setting inputted printing contents with classification information (e.g., printing mode setting information); a print processing unit 25 for executing process such as rasterizing or dithering of printing data; and a printing unit 26 for printing the printing data. The details of the individual functions will be described hereinafter.

In the system of FIG. 2, the TV receiver 1 includes the broadcast receiving unit 21, the data broadcast processing unit 22, the printing history storing unit 23, the printing mode setting unit 24 and the print processing unit 25, and the printer 12 includes the printing unit 26. This configuration is advantageous in that the printer can be manufactured at a relatively low cost, and in that the printer for the personal computer commonly used in the related art can be utilized as it is.

In the system of FIG. 3, the TV receiver 1 includes the broadcast receiving unit 21, the data broadcast processing unit 22, the printing history storing unit 23 and the printing mode setting unit 24, and the printer 12 includes the print processing unit 25 and the printing unit 26. This configuration is advantageous in that the printer having the print processing unit 25 can be used as it is in case it comes into wide use.

In the system of FIG. 4, the TV receiver 1 includes the broadcast receiving unit 21, the data broadcast processing unit 22 and the printing history storing unit 23, and the printer 12 includes the printing mode setting unit 24, the print processing unit 25 and the printing unit 26. When the user is to confirm or change the printing mode, which has been set by the printing mode setting unit 24 in the printer 12, the user utilizes the screen of the TV receiver 1 or the remote control. Alternatively, it is preferred to provide the printer 12 with display means such as an LED (Light Emitting Diode) or an LCD (Liquid Crystal Display) and operation means such as a switch or a touch panel. This configuration is advantageous in that the TV receiver 1 can be manufactured at a relatively low cost.

In the system of FIG. 5: the TV receiver 1 includes the broadcast receiving unit 21, the data broadcast processing unit 22 and the printing history storing unit 23; the printer 12 includes the printing unit 26; and the printer adapter 13 includes the printing mode setting unit 24 and the print processing unit 25. When the printing mode set by the printing mode setting unit 24 in the printer adapter 13 is to be confirmed or changed, the screen of the TV receiver 1 or the remote control is utilized. Alternatively, it is preferred to provide the printer adapter 13 with display means such as an LED or an LCD and operation means such as a switch or a touch panel. This configuration is advantageous in that the TV receiver 1 and the printer 12 can be manufactured at a relatively low cost, and in that the printer for the personal computer commonly used in the related art Can be utilized as it is.

In the system of FIG. 6, the printer built-in TV receiver 14 includes the broadcast receiving unit 21, the data broadcast processing unit 22, the printing history storing unit 23, the printing mode setting unit 24, the print processing unit 25 and the printing unit 26. This configuration is advantageous in that the entire system can be configured at a relatively low cost, and in that the installation space can be reduced.

The flows of processes in the print processing system thus configured will be described in the following.

First Embodiment

The processing flows in the first embodiment will be described with reference to the flow chart of FIG. 7. As a specific example, here will be described the processes of the case, in which five printing contents shown at (I), (II), (III), (IV) and (V) in FIG. 12 are sequentially inputted to the TV receiver 1.

<Process on Printing Contents (I)>

At Step S101, the broadcast receiving unit 21 receives a broadcast and separates it into images, voices, data of data broadcast and other data, and stores them in storage areas.

At Step S102, the data broadcast processing unit 22 analyzes the data of data broadcast, and presents them in the screen. In the screen example of FIG. 10, the data broadcast displays a "PRINT PHOTOGRAPH" button and a "PRINT MAP" button.

At Step S103, the operation to select printing contents is performed on the data broadcasting screen, and the routine advances to Step S104. Without the printing contents selecting operation, the routine returns to Step 5101. In the example of the data broadcasting screen of FIG. 10, it is the printing contents selecting operation to click either the "PRINT PHOTOGRAPH" button or the "PRINT MAP" button. When the "PRINT PHOTOGRAPH" button is clicked, the printing contents (I) are selected.

The printing contents of one case are composed of, for example, one XHTML (Extensible HyperText Markup Language) file, 0 or more CSS (Cascading Style Sheet) files and 0 or more image files. Alternatively, the XHTML file may be replaced by the HTML (HyperText Markup Language) file or the XML (Extensible Markup Language) file, or the CSS file may be replaced by the XSL (Extensible Stylesheet Language) file. The XHTML, CSS, HTML, XML and XSL accord to the standards issued by W3C (World Wide Web Consortium).

The XHTML file is a text file (or text data), and describes the contents of the text to be printed, the file name of the image file, the hierarchical structure of the text or image and the like. The CSS file is a text file (or text data) called the stylesheet, and describes the background colors, the letter colors, the font kinds, the font sizes, the area positions and sizes, and the like for the individual elements composing the hierarchical structure of the XHTML file. The image file is a binary file (or binary data) and is compressed in the format such as the JPEG (Joint Photographic Coding Experts Group) or the PNG (Portable Network Graphics). Usually, capacities of printing contents are mostly occupied by image files.

Here, the HTML and XML have grammars similar to those of the XHTML, and the processes on the XHTML, as will be detailed, can be diverted to those of the HTML and XML.

The printing contents (I) are composed of one XHTML file (having a file name: nihonbashi.html) shown in FIG. 13, one CSS file (having a file name: travel.css) shown in. FIG. 14, and one JPEG image file (having a file name: nihonbashi.jpg), although not shown.

At Step S104, on the basis of the past printing history data stored in the printing history storing unit 23, the printing mode setting unit 24 determines whether or not the printing contents (I) belongs to the registered series. The detailed determination method will be described hereinafter. If the printing contents (I) belong to registered series, the routine advances to Step S111. If the printing contents (I) do not belong to any registered series, the routine advances to Step S105. At first, no series is registered, and it is determined that the printing contents (I) do not belong to any registered series. The routine advances to Step S105.

Figure 11:
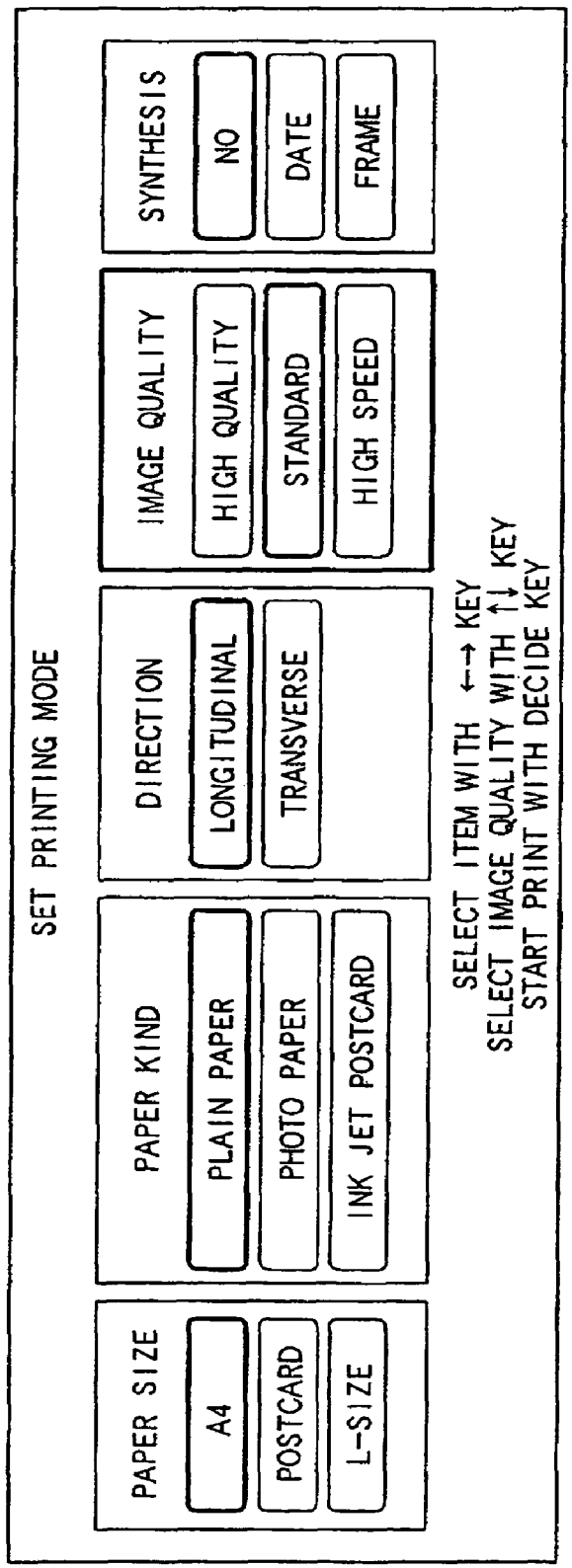
FIG. 11 is a printing mode setting screen.

At Step S105, the printing mode setting unit 24 displays the printing mode setting screen of FIG. 11, and presents the default printing mode. This printing mode contains the set values such as the paper size, the paper kind, the direction, the image quality and the synthesis. The default printing mode takes a predetermined initial value just after the system initialization, and continues the set value, which has been previously set by a user, at the second time and later. At this time, the predetermined initial value is set just after the system initialization.

In the operations from Step S106 to Step S108, the set value of the printing mode is changed if the printing mode changing operation is done by the user, and the routine advances to Step S109 if the print starting operation is done. In the printing contents (I), the user selects and changes the individual items of the paper size, the paper kind, the direction, the image quality and the synthesis in the printing mode screen of FIG. 11 with the arrow keys of the remote control into the set values shown in the column (I) of FIG. 12, and performs the print starting operation with the decision key.

At Step S109, a new series is created/registered as the series, to which the printing contents at this time belong, and the printing contents and the printing mode setting information (or the classification information) at this time are so stored in the printing history storing unit (or the storage unit) 23 as to correspond to the series. In this embodiment, this process corresponds to the classification of the printing contents. As the printing mode setting information, there stored the set values of the paper size="L-SIZE", the paper kind="PHOTO PAPER", the direction="TRANSVERSE", the image quality="HIGH", and the synthesis="FRAME".

At Step S110, the print processing unit 25 performs the printing data process such as rasterization or dither. At this time, the algorithm and the parameter are selected according to the set printing mode. In case the synthesis is set as the printing mode, the printing contents sent by the data broadcasting are synthesized with the contents (e.g., the date or the frame) intrinsic to the present print processing system and are printed. According to the output data of the print processing unit 25, the printing unit 26 controls the ink injection or the paper feed, and outputs the paper of the printed result. Thus, the routine is ended.

Figure 18:
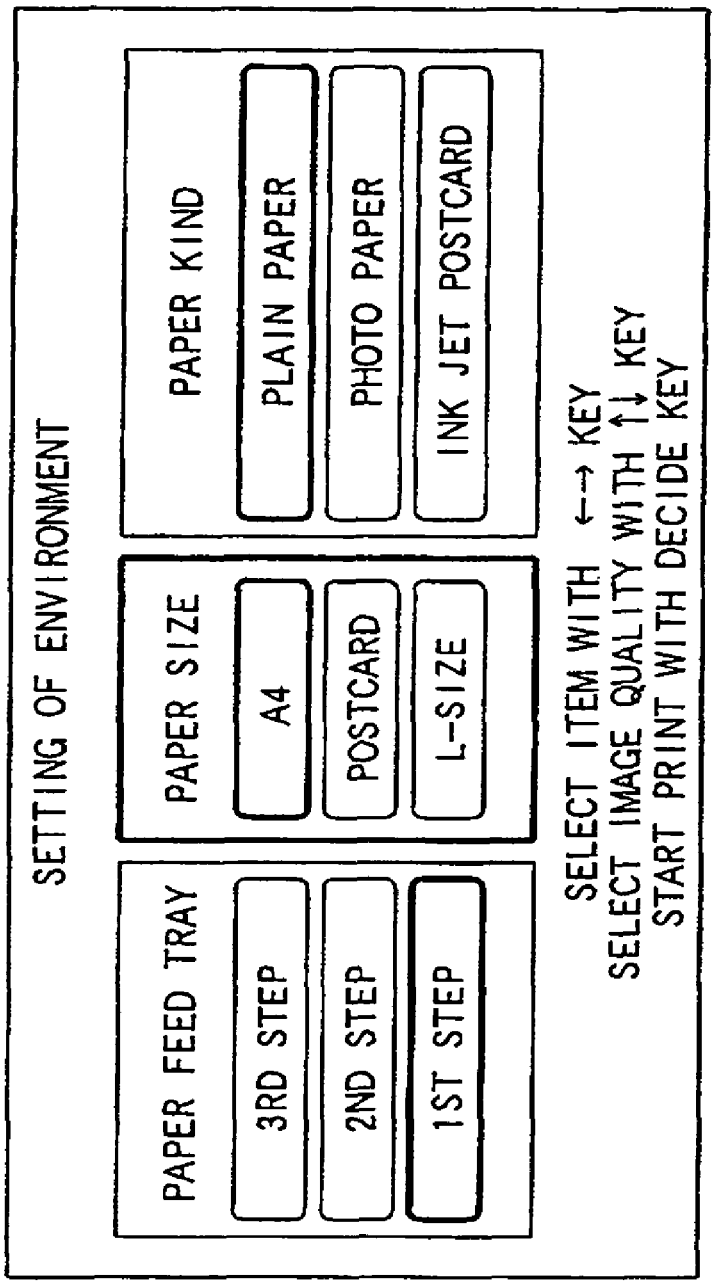
FIG. 18 is an environment setting screen.

The printer used in this embodiment is provided with a plurality of paper feed trays so as to eliminate the troubles in the interchange of paper sheets at each time. The paper sizes and kinds corresponding to the individual paper feed trays are preset in the environment setting screen of FIG. 18 by the user. When the paper size and kind are set as the printing mode, the printer feeds the paper from the paper feed tray, in which the paper sheets, which are set in the printing mode, have been set, on the basis of the correspondence of the paper feed tray and the paper sheets which are set in the environment setting.

<Process on Printing Contents (II)>

Step S101 and Step S102 are similar to those of the contents (I). The contents (I) and (II) are the same data broadcasting programs and display the same screen of FIG. 10.

At this time, the printing contents (II) are selected at Step S103, when the "PRINT MAP" button is clicked.

The printing contents (II) are composed of the XHTML file (having a file name: nihonbashimap.html) of FIG. 15, the CSS (having a file name: map.css) of FIG. 16 and the not-shown PNG image file (having a file name: nihonbashimap.png).

At Step S104, the printing mode setting unit 24 determines whether or not the printing contents of this time belong to the registered series based on the past printing history data stored in the printing history storing unit 23.

Since the series have been registered when the printing contents (I) were printed, as described above, it is determined, by comparing the stored printing contents (I) with the printing contents (II) of this time, whether or not the same information is contained in the two contents or how much the same information is contained. In other words, the printing mode setting unit (or classification unit) 24 determines the similarity between the contents, which were previously inputted and classified into a certain series, and the contents which are newly inputted but not classified yet.

If the printing contents (I) and (II) are compared, they are absolutely different in the formats of the printed results and in the contents of the XHTML file, the CSS file and the image file. As a result, it is determined that the printing contents (II) have no similarity to the printing contents (I), namely, they do not belong to the registered series. In this case, too, the routine advances to Step S105. The detail of the determination process will be described in detail.

At Step S105, the printing mode setting unit 24 displays the printing mode setting screen and displays the default printing mode. At this second time, the printing mode setting unit 24 presents the value which has been set by the user when the printing contents (I) were printed at the previous time.

In the operations from Step S106 to Step S108, the set value of the printing mode is changed if the printing mode changing operation is done by the user, and the routine advances to Step S109 if the print starting operation is done. For the printing contents (II), it is assumed that the user performs the print starting operation with the decision key after changing the set values to those presented in the column (II) of FIG. 12.

At Step S109, a new series is created/registered as the series, to which the printing contents at this time belong, and the printing contents and the printing mode setting information of this time are so stored in the printing history storing unit 23 as to correspond to the series. As the printing mode setting information, there stored the set values of the paper size="A4", the paper kind="PLAIN PAPER", the direction="LONGITUDINAL", the image quality="HIGH SPEED", and the synthesis="NO".

At Step S110, the print process is performed as in the case of the printing contents (I).

<Process on Printing Contents (III)>

Figure 10:
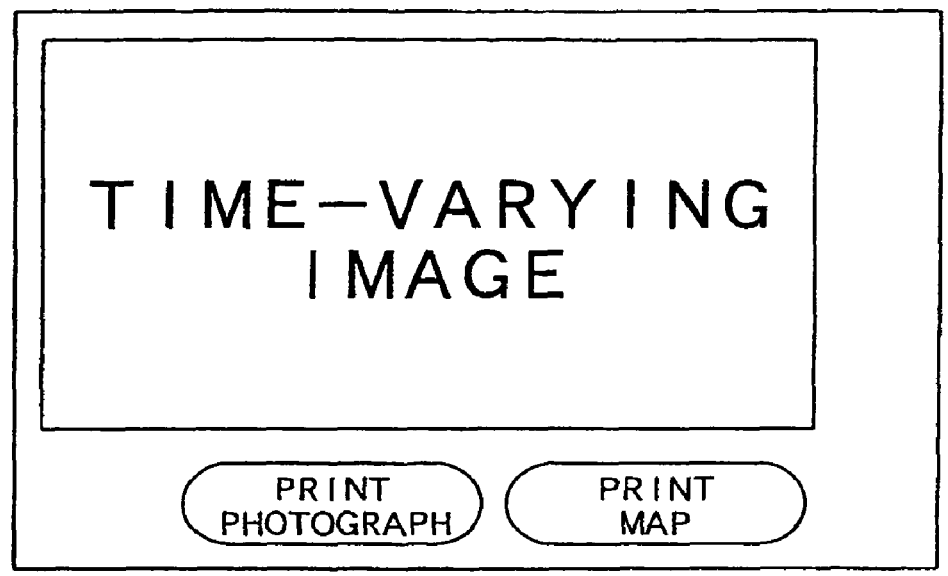
FIG. 10 is one example of a data broadcasting screen.

The printing contents (III) are selected in the screen of FIG. 10.

The printing contents (III) are composed of the XHTML file (having a file name: kanagawa.html) of FIG. 17, the CSS (having a file name: travel.css) of FIG. 14 and the not-shown JPEG image file (having a file name: kanagawa.jpg).

At Step S104, the printing mode setting unit 24 determines whether or not the printing contents of this time belong to the registered series based on the past printing history data stored in the printing history storing unit 23.

Since the series have been registered when the printing contents (I) and (II) were printed, as described above, it is determined by comparing the stored printing contents with the printing contents of this time. If the printing contents (I) and (III) are compared, they are remarkably similar in the formats, although the contents of the images and the texts are interchanged. Specifically, the printing contents (I) and (III) are identical in the background colors, the letter colors, the font kinds, the font sizes, and the positions and sizes of the photograph areas and the text areas. If the printing contents (I) and (III) are compared, on the other hand, they are absolutely different in the formats of the printed results and in the contents of the XHTML file, the CSS file and the image file.

As a result, it is determined that the printing contents (III) belong to the registered series relating to the printing contents (I). Therefore, the routine advances to Step S111.

At Step S111, the printing mode setting unit (or setting unit) 24 sets the stored printing mode setting information (or classification information) corresponding to the registered series, automatically as the printing mode setting information of this time, and the routine advances to Step S110. In this case, therefore, the print processing is performed not through either the printing mode changing operation of Step S106 or the print starting operation of Step S108.

<Process on Printing Contents (IV)>

It is determined that the printing contents (IV) does not belong to the same series as those of any of the past printing contents (I), (II) and (III). Therefore, a new series is registered.

<Process on Printing Contents (V)>

It is determined that the printing contents (V) belongs to the same series as that of the printing contents (I), and the print process is performed not through the printing mode changing operation of Step S106 and the print (Similarity Determination Process)

The method, at Step S104, for determining whether or not the printing contents of this time belong to the registered series will be described in detail with reference to the flow chart of FIG. 8.

At Step S201, a loop variable n for counting the series is initialized to 1.

If, at Step S202, the loop variable n is less than the number of registered series, the routine advances to Step S203, at which a process for the n-th series is processed.

At Step S203, the data of new printing contents and the data of the printing contents corresponding to the n-th series are compared. If a predetermined similarity determination condition is satisfied, the routine advances to Step S204, at which it is determined that the new printing contents belong to the n-th series, and the routine is ended.

If the predetermined similarity determination condition is not satisfied, the routine advances to Step S205, at which the loop variable n is incremented by 1, and the routine returns to Step S202 for the subsequent series.

If the predetermined similarity determination condition is not satisfied even if the loop process is repeated by the number of the registered series, the routine leaves the loop at Step S202 and advances to Step S206, at which it is determined that the new printing contents do not belong to any of the registered series, and the routine is ended.

In this embodiment, the similarity is judged noting the CSS file of the text data. The printing contents of one case contain 0 or more CSS files. This is based on the assumption that the same CSS files are mostly used every time in the printing contents of a series, because they are a set of the printing contents having remarkably similar formats.

In case the CSS files of the new printing contents are two of "cooking.css" and "japanese.css", if there are two CSS files corresponding to the n-th series and if they have the same filenames of "cooking.css" and "japanese.css" and if the contents of "cooking.css" are identical and if the contents of "japanese.csso" are also identical, then it is determined that the new printing contents belong to the n-th series.

Figure 7:
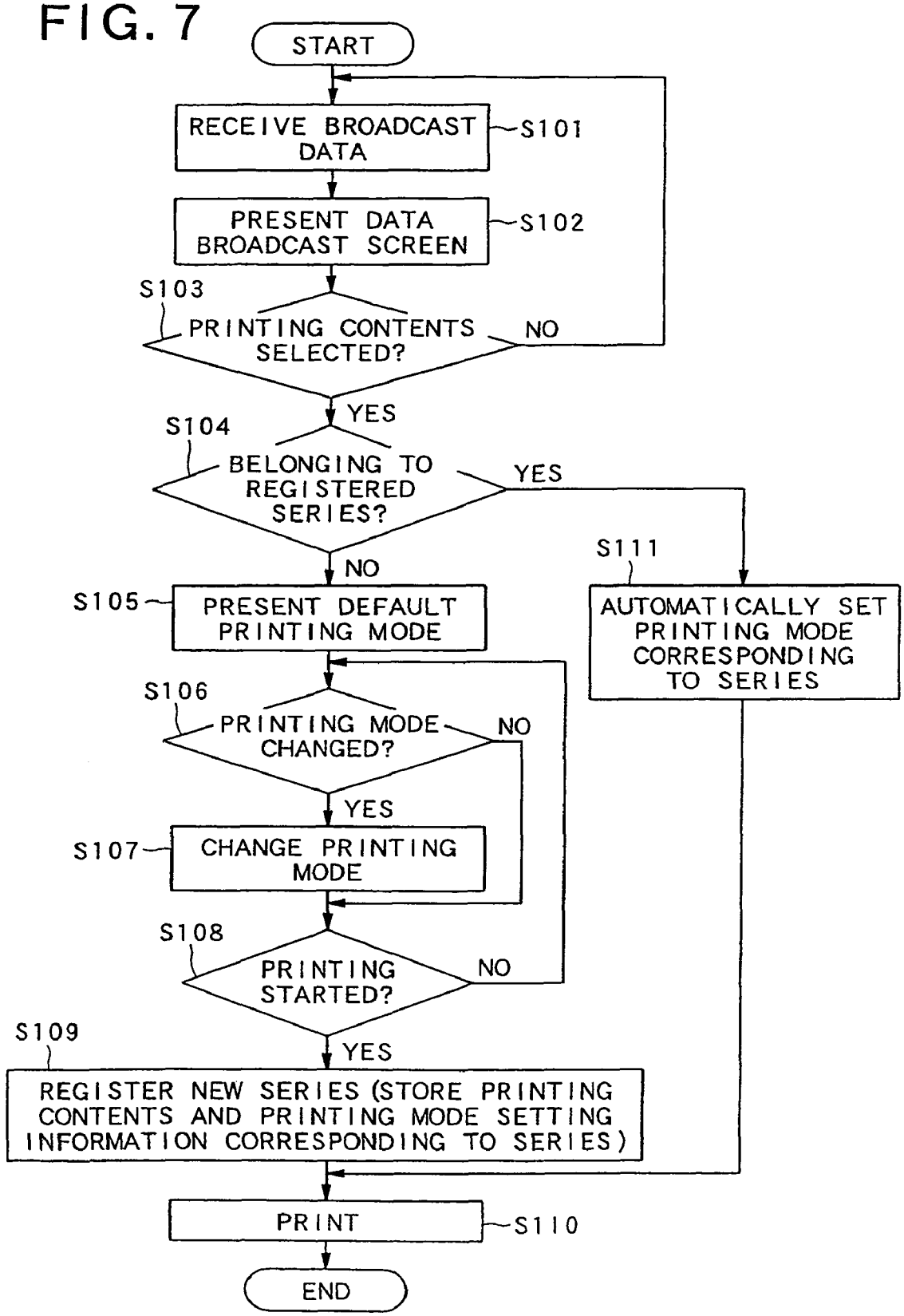
FIG. 7 is a flow chart showing the flows of a print processing system in the first embodiment.

It is premised at Step S109 of FIG. 7 that all the (0 or more) CSS files contained in the printing contents are stored when the printing contents are to be stored corresponding to the new series. At Step S203 of FIG. 8, moreover, the (0 or more) CSS files of the new printing contents and the (0 or more) CSS files corresponding to the n-th series are compared.

Figure 19:
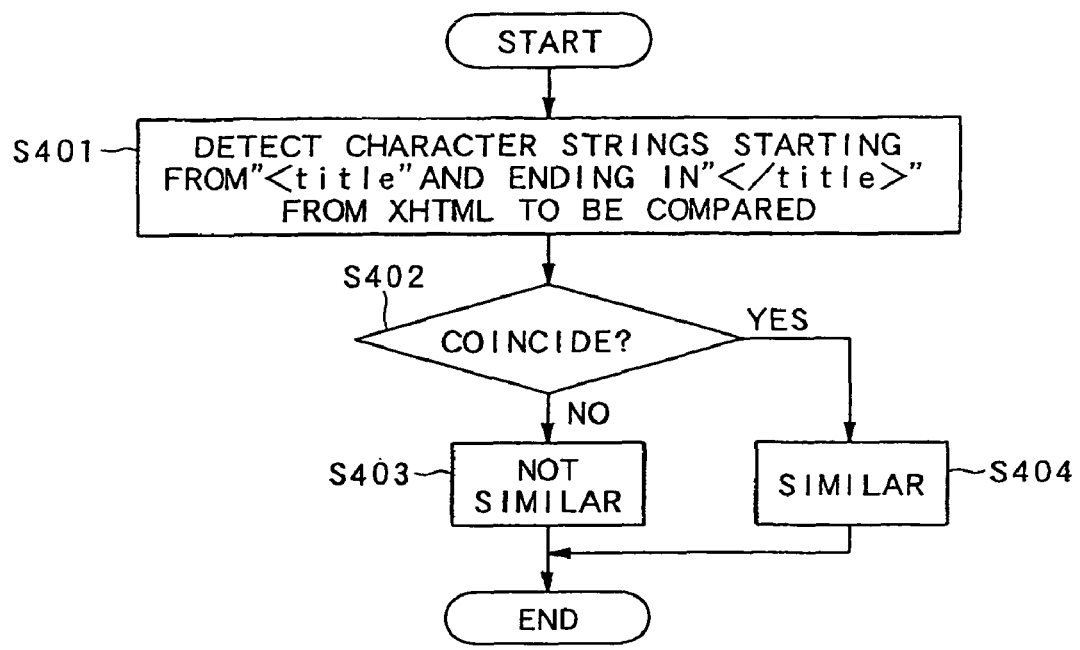
FIG. 19 is a flow chart showing the flows of a similarity determination process in the second embodiment.

With reference to the flowchart of FIG. 19, here will be described in detail the method at Step S203 for determining whether or not the two printing contents are Similar by comparing the new printing contents and the printing contents corresponding to the n-th series.

If, at Step S301, the number of the CSS files of the new printing contents and the number of the CSS files' corresponding to the n-th series are equal and are one or more, the routine advances to Step S302, at which the process continues. Otherwise, the routine advances to Step S307, at which the routine is ended by determining that the CSS files are not similar.

At Step S302, a loop variable i for counting the CSS files is initialized to 1.

If, at Step S303, the loop variable i is less or equal to the number of the CSS files, the routine advances to Step S304, at which the i-th CSS file is processed.

If, at Step S304, the CSS file having the same name to the i-th CSS file of the new printing contents exists, the routine advances to Step S305. Otherwise, the routine advances through the loop to Step S307, at which the routine is ended by determining that the similarity does not exist.

At Step S305, the CSS files having the same name are compared in their contents. This step is processed by comparing text data. If the contents of the two files coincide (match), the routine advances to Step S306, at which the loop variable i is incremented by 1, and the routine returns to Step S303, at which the next CSS file is processed. Otherwise, the routine advances through the loop to Step S307, at which the routine is ended by determining that the similarity does not exist.

When the loop process is repeated by the number of the CSS files so that the contents of all the CSS files of the same name coincide, the routine advances at Step S303 through the loop to Step S308, at which the routine is ended by determining that the similarity exists.

According to this embodiment, as has been described hereinbefore, a plurality of printing contents sharing the CSS files are deemed to belong to the same series and are set in the same printing mode. Thus, the printing contents of the series sharing the CSS files can be printed in a unified printing mode.

Moreover, the printing contents printed in the past and the printing mode setting information are classified and stored in a series. When the printing contents are newly inputted, they are determined by the similarity to the printing contents already classified. In case it is determined that the similarity exists, the printing mode setting information of the similar printing contents can be automatically set as the printing mode setting information of the new printing contents. Thus, this effects a result in that the user operation can be lightened and in that display of the operation panel obstructing the enjoyment of the TV programs can be reduced.

According to this embodiment, moreover, of the data contained in the printing contents, only the text data (i.e., the CSS file of the style sheet) having a small capacity are compared to raise an effect that the data can be rapidly processed.

Second Embodiment

Figure 8:
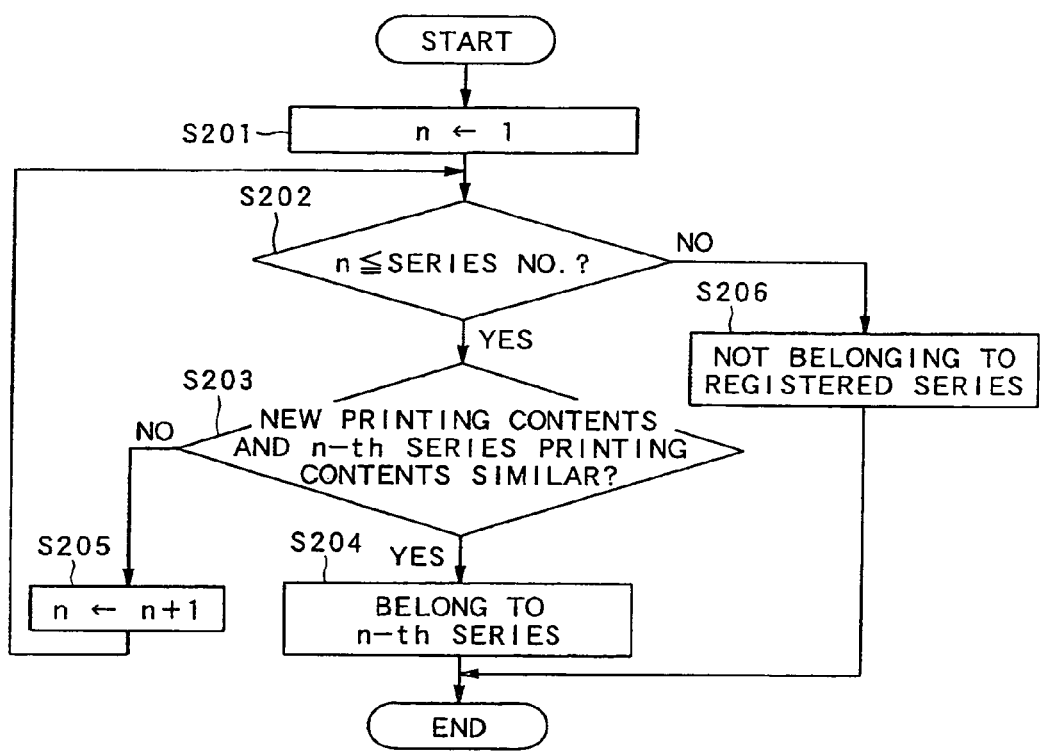
FIG. 8 is a flow chart showing the flows of a similarity determination process in the first embodiment.
Figure 9:
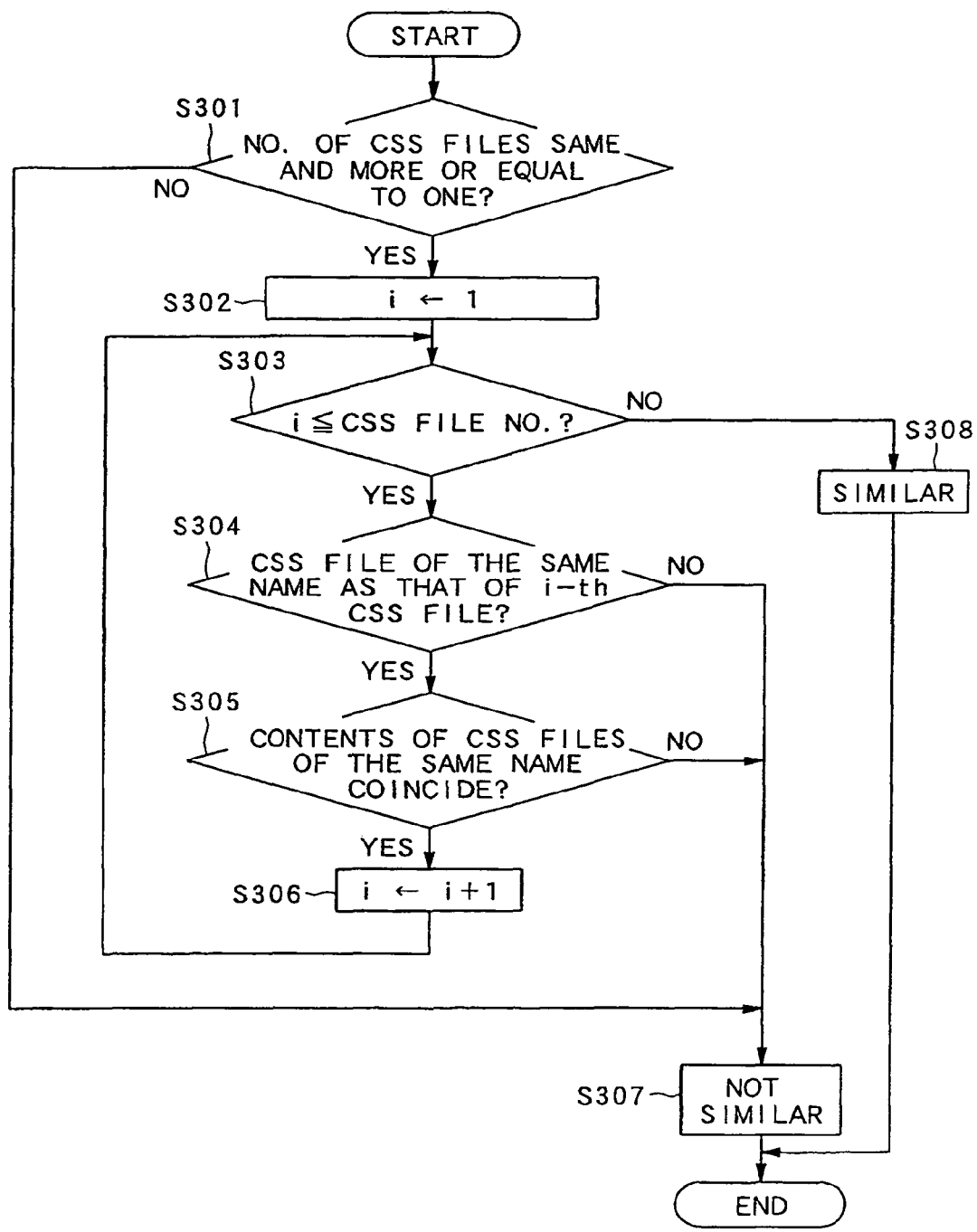
FIG. 9 is a flow chart showing the flows of a similarity determination process in the first embodiment.

In the second embodiment of the invention, at Step S203 of the flow chart of FIG. 8, the data of the new printing contents and the data of the printing contents corresponding to the n-th series are compared to determine their similarity by noting the XHTML file of the text data.

When an XHTML file of the printing contents of a series is to be created, it is thought in most cases that a past XHTML file of the same series is partially corrected to create a new XHTML file. This is based on the assumption that the same title for the title elements, i.e., from the <title> tag to the </title> tag, is mostly used as it is without any correction.

In case the XHTML file of the new printing contents is the "kanagawa.html" of FIG. 17 and in case the XHTML file corresponding to the n-th series is the "nihonbashi.html" of FIG. 15, for example, both their title elements are identical in the character strings of "<title> JOYFUL TRIP: PHOTOGRAPH</title>". It is, therefore, determined that the new printing contents belong to the n-th series.

It is premised at Step S109 of FIG. 7 that the XHTML file contained in the printing contents is stored when the printing contents are to be stored corresponding to the new series. At Step S203 of FIG. 8, the XHTML file of the new printing contents and the XHTML file corresponding to the n-th series are compared.

With reference to the flow chart of FIG. 19, here will be described in detail the method at Step S203 for determining whether or not they are similar it by comparing the new printing contents and the printing contents corresponding to the n-th series.

At Step S401, the character strings beginning from "<title" and ending in "</title>" are extracted from the contents of the individual XHTML files to be compared.

If the extracted character strings coincide at Step S402, the routine advances to Step S404, at which the routine is ended by determining the similarity exists.

Otherwise, the routine advances to Step S403, at which the routine is ended by determining the similarity does not exist.

According to this embodiment, as has been described hereinbefore, the plural printing contents having the same title elements of the XHTML file are set to the same printing mode while deeming them as the identical series, so that the series of the printing contents having the same title elements can be printed in the unified printing mode.

Moreover, the printing contents printed in the past and the printing mode setting information Pare classified and stored in the series, and the similarity between new printing contents and the classified printing contents is determined, when inputted. In case the similarity exists, the printing mode setting information of the similar printing contents can be automatically set as the printing mode setting information of the new printing contents. This results in an effect that the user operation can be lightened.

According to this embodiment, moreover, of the data contained in the printing contents, only the text data (i.e., the XHTML file) having a small capacity and only their title elements are compared to raise an effect that the data can be rapidly processed.

Third Embodiment

In the third embodiment of the invention, at Step S203 of the flow chart of FIG. 8, the data of the new printing contents and the data of the printing contents corresponding to the n-th series are compared to determine their similarity by noting the XHTML file of the text data.

When a XHTML file of the printing contents of a series is to be created, it is thought in most cases that a past XHTML file of the same series is partially corrected to create a new XHTML file. Specifically, this is based on the assumption that a new XHTML file is mostly to be created by replacing the intrinsic information (e.g., the image file name, the text to be actually printed and so on) in an existing file.

In case the XHTML file of the new printing contents is the "kanagawa.html" of FIG. 17 and in case the XHTML file corresponding to the n-th series is the "nihonbashi.html" of FIG. 15, for example, only the portions of the image file names of "data="nihonbashi.jpg"" and "data="kanagawa.jpg"" and only the portions of "NIHON-BASHI" and "KANAGAWA" of the text to be actually printed are different, but the remaining portions coincide. It is, therefore, determined that the new printing contents belong to the n-th series.

It is premised at Step S109 of FIG. 7 that the XHTML file contained in the printing contents is stored when the printing contents are to be stored corresponding to the new series. At Step S203 of FIG. 8, the XHTML file of the new printing contents and the XHTML file corresponding to the n-th series are compared.

Figure 20:
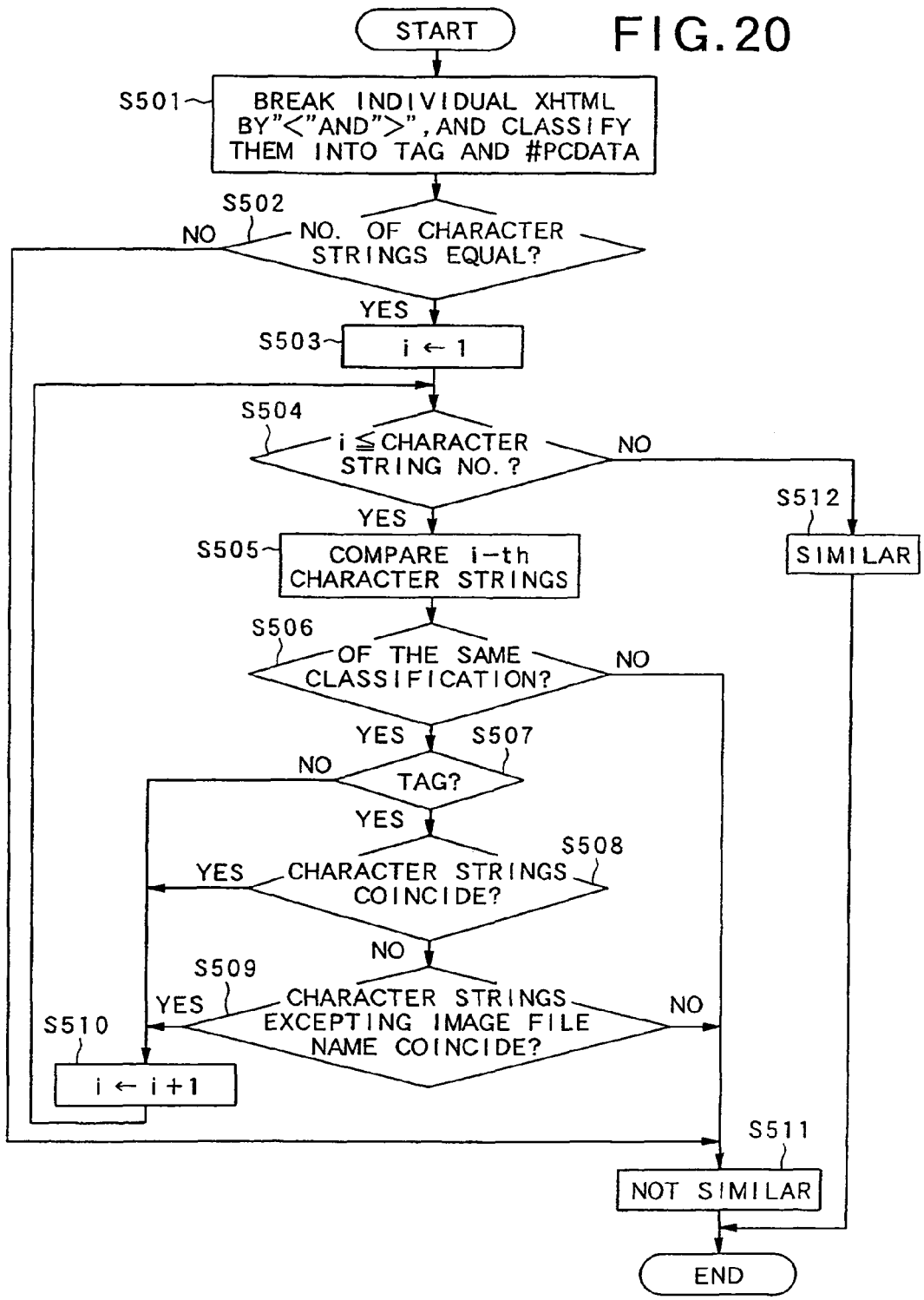
FIG. 20 is a flow chart showing the flows of a similarity determination process in the third embodiment.

With reference to the flow chart of FIG. 20, here will be described in detail the method at Step S203 for determining whether or not they are similar by comparing the new printing contents and the printing contents corresponding to the n-th series.

At Step S501, the contents of each XHTML files to be compared are broken with the inequality signs "<" and ">" so that the individual broken character strings are classified into the tags and the remaining texts (#PCDATA). The character strings from "<" to the next ">" are tags, and the character strings just after ">" to just before the next "<" are #PCDATA.

If, at S502, the numbers of the aforementioned broken character strings of the individual XHTML files to be compared are equal, the routine advances to Step S503. Otherwise, the routine advances to Step S511, at which it is determined that the XHTML files to be compared are not similar, and the routine is ended.

At Step S503, the loop variable i for counting the broken character strings is initialized to 1.

If, at Step S504, the loop variable i is less or equal to the aforementioned character string number, the routine advances to Step S505, at which the i-th character string is processed.

At Step S505, the i-th character string of the individual XHTML files is compared.

If the i-th character string belongs at Step S506 to the same classification, i.e., the tags or the #PCDATA, the routine advances to Step S507. If the i-th character string belongs to different classifications, that is, one is the tag whereas the other is the #PCDATA, the routine advances to Step S511, at which it is determined that the XHTML files to be compared are not similar, and the routine is ended.

If the identical classifications are the tags at Step S507, the routine advances to Step S508. If the classifications are not the tags but the "#PCDATA", the routine advances to Step S510.

If the i-th character strings coincide at Step S508, the routine advances to Step S510. Otherwise, the routine advances to Step S509.

If the character strings excepting the image file name from the i-th character string coincide at Step S509, the routine advances to Step S510. If the character strings excepting the image file name from the i-th character string do not coincide, the routine advances to Step S511, at which it is determined that the XHTML files to be compared are not similar, and the routine is ended.

The image file name is described as either the value of the data attribute of the object element or the value of the src attribute of the img element. In case the tags begin from the character strings of "<object", the character strings of "data=" are retrieved from those tags, and the succeeding character strings enclosed by the quotations are the values of the data attributes, i.e., the image file name. In case the tags begin from the character strings of "<img", the character strings of "src=" are retrieved from those tags, and the succeeding character strings enclosed by the quotations are the value of the src attributes, i.e., the image file name.

In case the tag of the object element of FIG. 15 and the tag of the object element of FIG. 17 are compared, for example, the character strings do not coincide at Step S508, and the routine advances to Step S509. At Step S509, the character strings excepting the value of the data attribute coincide so that the routine advances to Step S510.

At Step S510, the loop variable i is incremented by 1, and the routine returns to Step S504, at which the next character strings are processed.

The loop process is repeated by the number of the character strings. When all the character strings coincide other than the image file name and the #PCDATA, the routine advances at Step S504 through the loop to Step S512, at which it is determined that the similarity exists, and the routine is ended.

According to this embodiment, as has been described hereinbefore, the plural printing contents which are different only in the image file name of the contents of the XHTML file and the text to be actually printed, are set in the same printing mode while being deemed as the identical series. Therefore, the printing contents in the series sharing the model of the XHTML file can be printed in the unified printing mode.

Moreover, the printing contents printed in the past and the printing mode setting information are classified and stored in the series, and the similarity between new printing contents and the classified printing contents is determined, when inputted. In case the similarity exists, the printing mode setting information of the similar printing contents can be automatically set as the printing mode setting information of the new printing contents. This results in an effect that the user operation can be lightened.

According to this embodiment, moreover, of the data contained in the printing contents, only the text data (i.e., the XHTML file) having a small capacity are compared to raise an effect that the data can be rapidly processed.

Fourth Embodiment

In the fourth embodiment of the invention, at Step S104 of the flow chart of FIG. 7, a plurality of determination methods are combined for determining whether or not the printing contents belong to the registered series.

The aforementioned determination method of the first embodiment is based on the assumption that the printing contents of a series are a set of the printing contents having remarkably similar formats so that the same CSS file is mostly used every time.

The aforementioned determination method of the second embodiment is based on the assumption that the printing contents of a series mostly use the title elements of the XHTML file without any modification from the <title> tags to the </title> tags.

The aforementioned determination method of the third embodiment is based on the assumption that the contents of the XHTML file of a series mostly share the portions other than the information (e.g., the image file names or the texts to be actually printed) intrinsic to the printing contents.

These assumptions hold in many cases so that the print processing system can attain the effects if it implements any of the aforementioned determination methods.

Since all of those assumptions are not necessarily satisfied, however, the printing contents of a series can be determined in more cases, if those plural determination methods are used together for their supplementation.

In case the plural methods are used together, however, the new printing contents may be classified into a series A by the first determination method and into another series B by the second determination method.

In this case, the similarity between the printing contents is converted into points, and the determination methods are weighted with the points so that the printing contents may be classified into the series having the highest points. Let it be assumed that the series A has 5 points whereas the series B has 2 points according to the first determination method, and that the series A has 3 points whereas the series B has 4 points according to the second determination method. With these assumptions, the series A is given a total of 8 points by summing 5 points and 3 points, and the series B is given a total of 6 points by summing 2 points and 4 points. Thus, the printing contents are classified into the series A having the more points.

Figure 21:
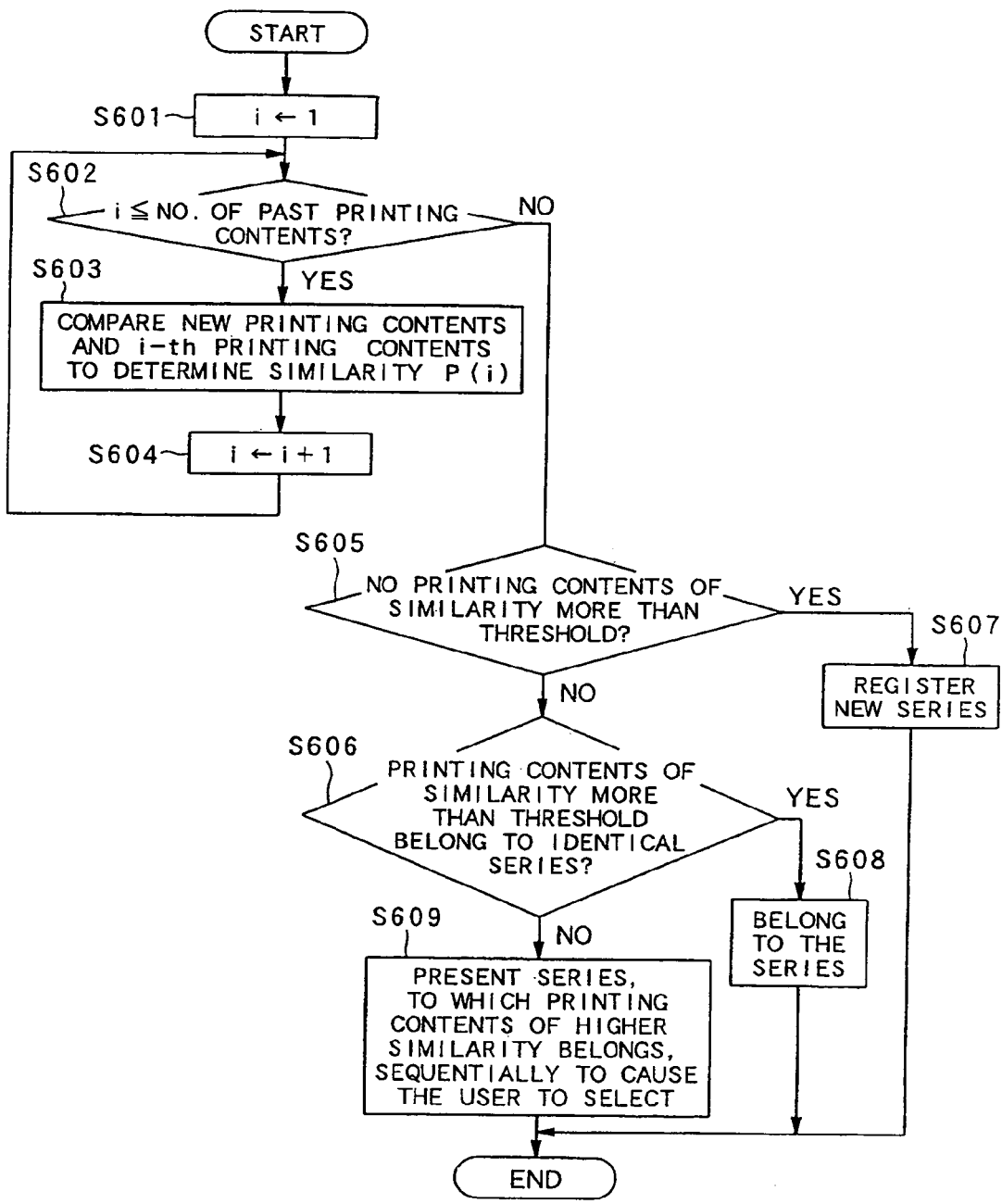
FIG. 21 is a flow chart showing the flows of a similarity determination process in the fourth embodiment.

The processing by using the plural determination methods will be described in detail with reference to the flow chart of FIG. 21.

At Step S601, the loop variable i for counting the past printing contents, i.e., the printing contents, which have been inputted beforehand and classified into the series, is initialized to 1.

If, at Step S602, the loop variable i is less than or equal to the number of the past printing contents, the routine advances to Step S603, at which the i-th printing content is processed.

At Step S603, the new printing contents and the i-th printing content are compared to determine a similarity P(i) as a numerical value, as will be described in detail.

At Step S604, the loop variable i is incremented by 1, and the routine returns to Step S602, at which the next printing contents are processed.

When the loop process is repeated by the number of the past printing contents, the routine advances through the loop at Step S602 to Step S605.

If no printing content having a similarity at or more than a predetermined threshold is at Step S605, the routine advances to Step S607, at which a new series is registered by deciding that the new printing contents do not belong to the registered series. The user operation is not required in this case. If one or more printing contents having the similarity at or more than the predetermined threshold is, the routine advances to Step S606.

If, at Step S606, all the printing contents having the similarity at or more than the predetermined threshold belong to the identical series, the routine advances to Step S608, at which it is determined that the new printing contents belong to that series. This case also requires no user operation. If all the series, to which the printing contents having the similarity at or more than the predetermined threshold belong, are not identical, the routine advances to Step S609.

At Step S609, a plurality of series are presented and entrusted to the selection of the user. In order to enhance the possibility of rapidly selecting the desired series, the presentation is started from the series to which the printing contents having the high similarity belong.

Figure 22:
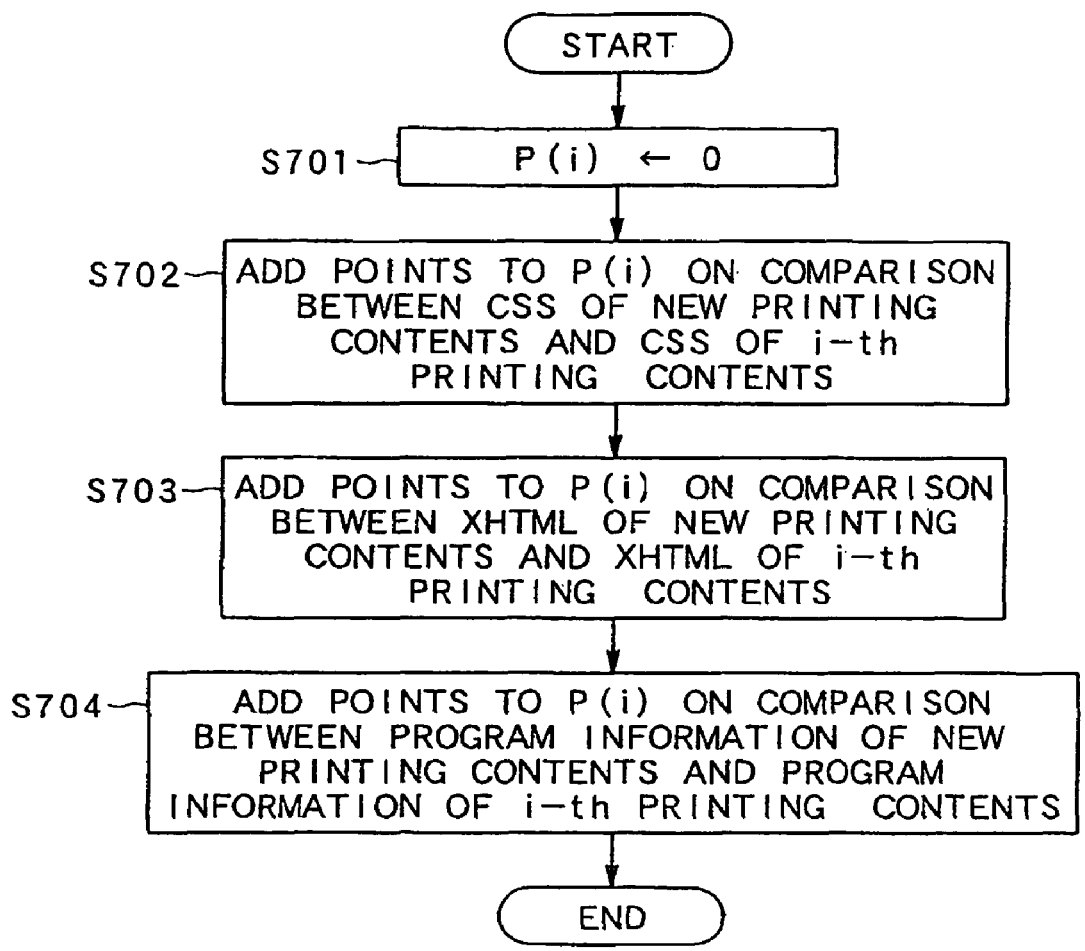
FIG. 22 is a flow chart showing how to determine the similarity in the fourth embodiment.

An example for determining the similarity of Step S603 will be described with reference to the flow chart of FIG. 22.

At Step S701, the variable P(i) indicating the point of the similarity between the new printing contents and the i-th printing content is initialized to 0.

At Step S702, a predetermined point is added to P(i) on the basis of the comparison between the CSS file of the new printing contents and the CSS file of the i-th printing content. 3 points are added, in case all the CSS files coincide, for example, as described in connection with the first embodiment.

In case one printing contents contains the plural CSS files, the predetermined point may be added according to the number of the coincident CSS files, even if all the CSS files do not coincide. 1 point is added in case the CSS file coincides with another CSS file in terms of a file name and contents.

At Step S703, a predetermined point is added to the P(i) on the basis of the comparison between the XHTML file of the new printing contents and the XHTML file of the i-th printing content. 3 points are added, for example, in case the title elements of the XHTML file coincide, as described in connection with the aforementioned second embodiment for another example, 3 points are added in case the portion of the contents of the XHTML file other than the image file name and the text to be actually printed coincide, as has been described in connection with the third embodiment.

Moreover, 1 point may be added in case the image file names coincide, and 1 point may also be added, if the texts to be actually printed coincide, as will be described hereinafter. The series printing contents are often common every time in the logo image or the heading text, and they may belong to the identical series if they coincide. Considering that the identical logo or heading may be used for the identical sponsor or broadcasting station even if they belong to different series, the point to be added is suppressed within a low value.

At Step S704, a predetermined point is added to the P(i) on the basis of the comparison between the program information of the new printing contents and the i-th printing content. The program information includes the channel number, the date, the day and the SI (Service Information). This SI is the information sent as a portion of the data of the digital TV broadcast and is specified as the standards of Association of Radio Industries and Businesses (ARIB).

In case the character strings of program names contained in the SI coincide, for example, 1 point is added. The printing contents of a series are often sponsored every times by a program having the same program name, as at (I), (III) and (V) of FIG. 12, so that they may be of the same series if the program name coincides. However, the added points are kept low considering that the same program may not be of the same series, as at (I) and (II) of FIG. 12.

Figure 23:
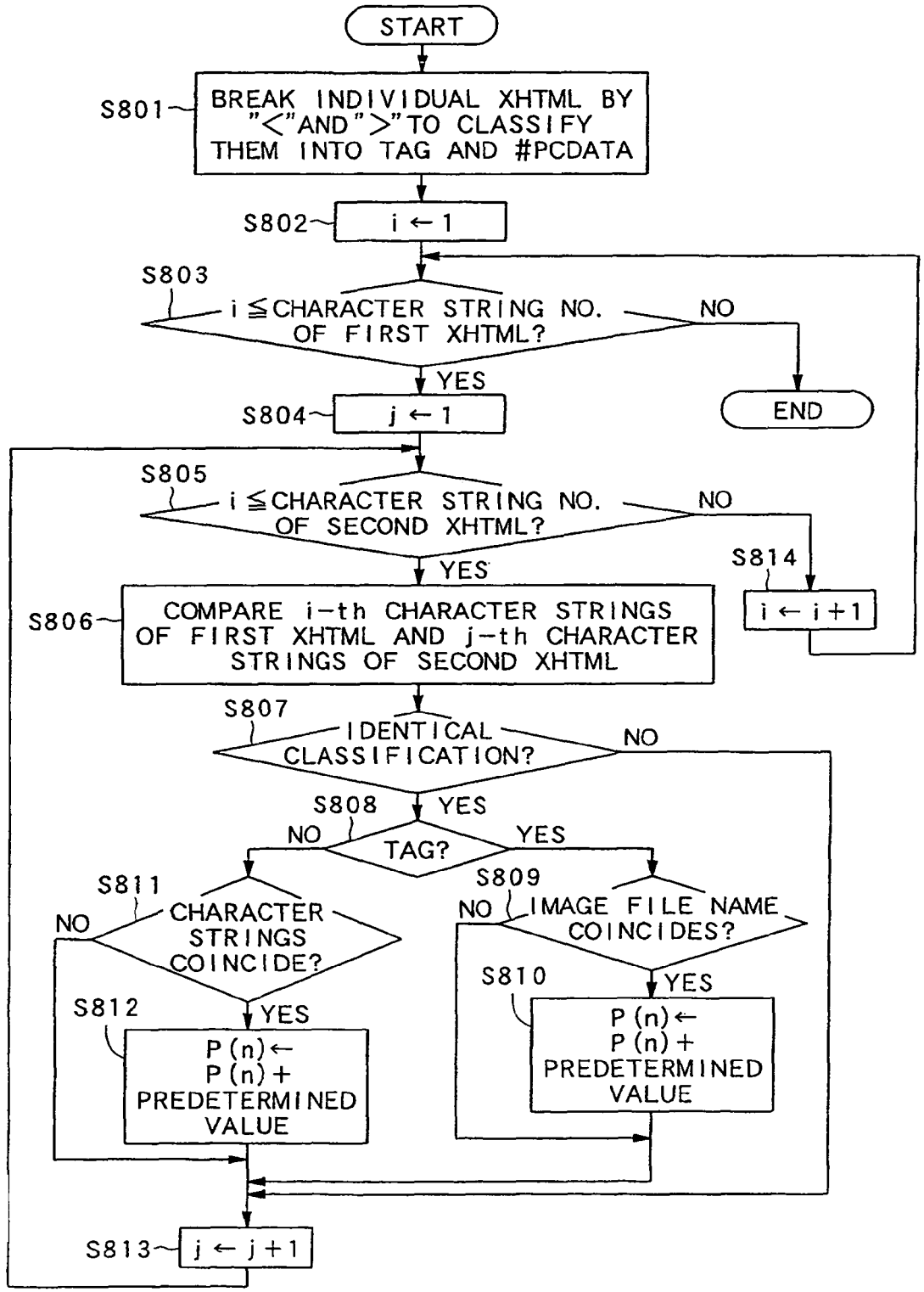
FIG. 23 is a flow chart showing a point adding process in the fourth embodiment.

An example of adding the point of the case at Step S703, in which the image file names coincide or in which the text to be actually printed coincide, will be described in more detail with reference to the flow chart of FIG. 23.

At Step S801, the contents of the individual XHTML files to be compared are broken with the inequalities "<" and ">", and the individual broken character strings are classified into the tags and the remaining texts (#PCDATA). The character strings from the "<" to the next ">" are the tags, and the character strings from just after ">" to just before the next "<" are the #PCDATA. Here, the numbers of the broken character strings of the individual XHTML files to be compared exert, even if different, no influence on the determination of the Similarity.

At Step S802, the loop variable i for counting the character strings of the first XHTML file to be compared is initialized to 1.

If, at Step S803, the loop variable i is less or equal to the number of the character strings of the first XHTML file, the routine advances to Step S804, at which the i-th character string of the first XHTML file is processed.

At Step S804, a loop variable j for counting the character strings of the second XHTML file to be compared is initialized to 1.

If, at Step S805, the loop variable j is less or equal to the number of the character strings of the second XHTML file, the routine advances to Step S806, at which the j-th character string of the second XHTML file is processed.

At Step S806, the i-th character string of the first XHTML file and the j-th character string of the second XHTML file are compared.

If, at Step S807, the compared character strings belong to the same classification, namely, are the tags or the #PCDATA, the routine advances to Step S808. If the character strings belong to different classifications, that is, if one is the tag whereas the other is #PCDATA, the routine advances to Step S813 without adding any point to a similarity P(n).

If, at Step S808, the same classification belongs to the tags, the routine advances to Step S809. If not, that is, if the same classification belongs to not the tags but the #PCDATA, the routine advances to Step S811.

If, at Step S809, the compared character strings are the tags indicating an image, and that the image file names coincide, the routine advances to Step S810. Otherwise, the routine advances to Step S813. The image file name is described as either the value of the data attribute of the object element or the value of the src attribute of the img element. In case the tag begins from the character string of "<object", the character string of "data=" is retrieved from that tag, and the succeeding character string enclosed by the quotations is the value of the data attribute, i.e., the image file name. In case the tag begins from the character string of "<img", on the other hand, the character string of "src=" is retrieved from the tag, and the succeeding character string enclosed by the quotations is the value of the src attribute, i.e., the image file name.

At Step S810, a predetermined numerical value is added to the similarity P(n). Specifically, if the plural printing contents share the same image, it enhances the possibility that the printing contents are of a series. For example, the fry.html of FIG. 25, i.e., the XHTML file of the printing contents (VI) of FIG. 24 and the dessert.html of FIG. 26, i.e., the XHTML file of the printing contents (VII) of FIG. 24 are compared. In this case, a coincidence is brought about between the portion "<object class="logo" type="image/png" data="abcd.png"/>" indicating the logo image of the sponsor and the portion "<object class="logo" type="image/png" data="efg.png"/>" indicating the logo image of the broadcasting station.

If it is decided at Step S811 that the aforementioned character strings compared, i.e., #PCDATA coincide, the routine advances to Step S812. Otherwise, the routine advances to Step S813.

At Step S812, a predetermined numerical value is added to the similarity P(n). If the plural printing contents share a common text, it indicates the higher possibility that they are the printing contents of a series. In case the fry.html of FIG. 25 and the dessert.html of FIG. 26 are compared, for example, coincidences are found at the individual character strings of "RECIPE", "DELICIOUS DISH", "SPONSORED" and "PRODUCED".

At Step S813, the loop variable j is incremented by 1, and the routine returns to Step S805, at which the succeeding character string of the second XHTML are processed.

When the loop process is repeated by the number of the character strings of the second XHTML, the routine advances at Step S805 through the loop to Step S814, at which the loop variable i is incremented by 1, and the routine returns to Step S803, at which the succeeding character strings in the first XHTML are processed.

When the loop process is repeated by the number of the character strings of the first XHTML, the routine is ended at Step S803 through the loop.

By the processes thus far described, the point is added to the P(i) in accordance with the coincidence of the image file name and the coincidence of the text to be actually printed.

According to this embodiment, as has been described hereinbefore, the plural printing contents having similar CSS files and XHTML files can be automatically classified into a series, so that the printing contents of a series can be printed in the unified printing mode.

Moreover, the similarity is determined by combining the plural decision methods so that the determination process become excellent in flexibility and versatility and can be performed to achieve highly reliable decision results. In case not only the contents of the images and texts are interchanged but also the numbers of the images and texts are different, for example, as at (VI) and (VII) of FIG. 24, they can be determined to belong to the same series if other conditions are satisfied. Here, this embodiment combines the determination methods of the foregoing first to third embodiments. If the method of adding the points is used, as described above, it is easy to combine not only the aforementioned determination methods but also various determination methods and determination conditions.

According to this embodiment, moreover, a new series is automatically created when the new printing contents are not similar to any of the past printing contents. Therefore, the user operation is not required even in case the printing contents of an absolutely new series are inputted.

In case the printing contents are similar to the plural past printing contents, moreover, they can be selected by the user by presenting the series in the order of higher similarities. Thus, the series can be classified more reliably by less user operations.

Fifth Embodiment

The foregoing first to fourth embodiments employ the printing mode setting information as the classification information with a view to unifying the printing modes. In the fifth embodiment of the invention, however, the relating information for relating the printing contents and the folders, into which the printing contents are classified, are used as the classification information with a view to arranging and displaying the numerous printing contents on the screen.

Moreover, this embodiment aims at processing not only the printing contents acquired from the TV broadcast but also the printing contents acquired from the Web (World Wide Web) or the E-mail. Here, the first to fourth embodiments may also aim at processing the printing contents acquired from the Web or the E-mail.

The contents of the Web are composed of one XHTML or HTML file, 0 or more CSS files and 0 or more image files. Alternatively, the Web contents may be composed of one XML file, 0 or more CSS files or XSL files, and 0 or more image files.

The contents of the E-mail are either the text data or the HTML data. Here, it is supposed the contents to be processed are the HTML data. In this case, the contents are composed of one HTML file and 0 or more image files.

Figure 27:
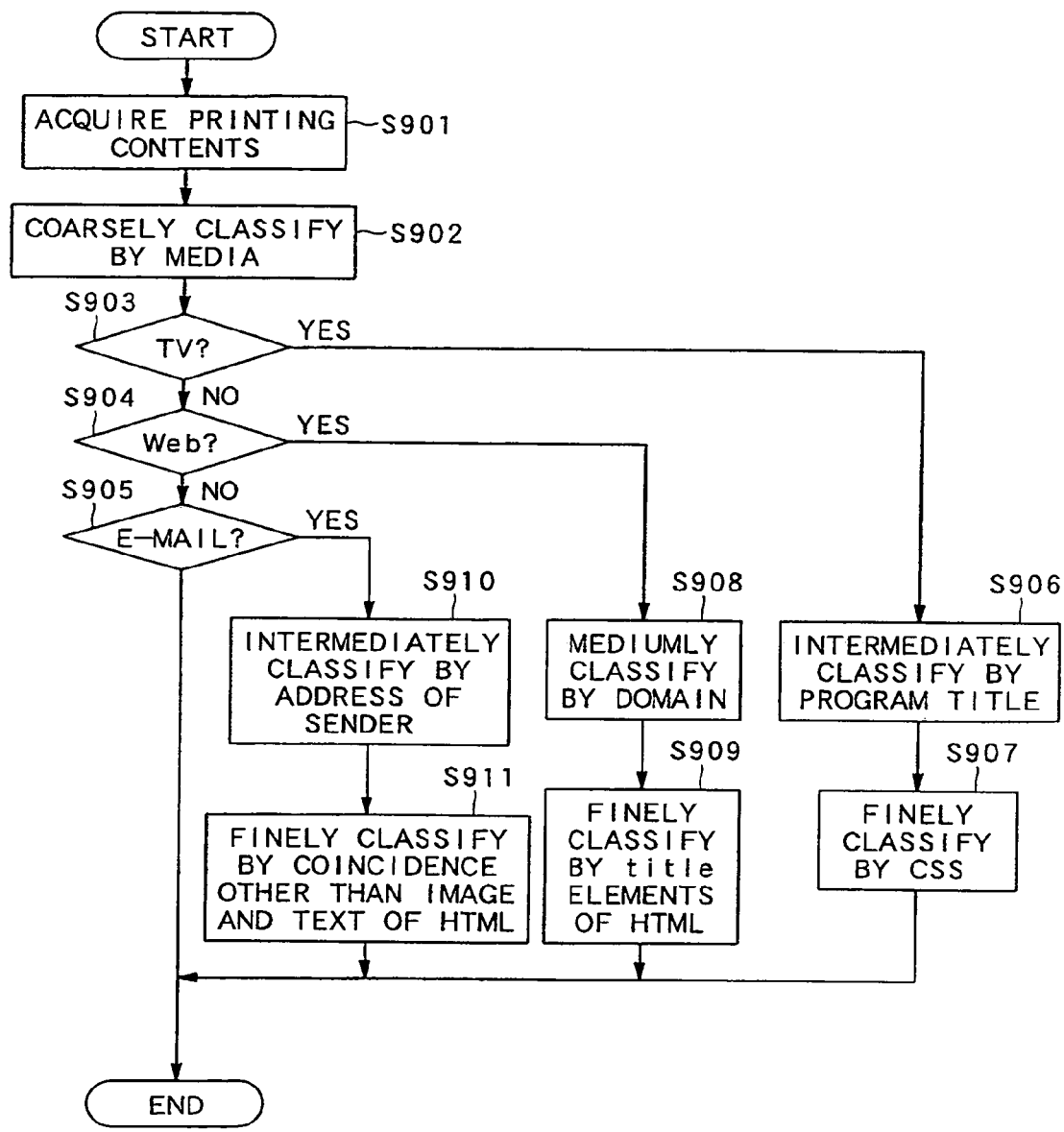
FIG. 27 is a flow chart showing the flows of classifying process in the fifth embodiment.

The method for classifying the printing contents, which are acquired from any of the TV broadcast, the Web and the E-mail, into series will be described in detail with reference to the flow chart of FIG. 27.

At Step S901, the new printing contents are acquired from the media such as the TV broadcast, the Web and the E-mail.

In this embodiment, prior to the determinations of the similarity in the first to fourth embodiments, the new printing contents are coarsely classified by a determination method different from above-described similarity determinations. Here will be described the process for classifying the printing contents at three stages of coarse classification, medium classification and fine classification. Here, the process to "classify the printing contents into the folders" corresponds to the process to create relating information for relating the printing contents and the corresponding folder.

At Step S902, the aforementioned new printing contents are coarsely classified by the individual media acquired. The printing contents are classified into one of the folders of the TV, the Web and the E-mail, as shown in the screen example of FIG. 28(a).

The operations at Step S903 to Step S905 are branched according to the media of the TV broadcast, the Web and the E-mail.

In case the aforementioned new printing contents are acquired from the TV broadcast, they are intermediately classified at Step S906 in accordance with the program name acquired from the SI. The printing contents are classified into one of the folders for the individual programs names, as shown as a screen example in FIG. 28(b). If the folder of the program is already created at the time when the new printing contents were acquired, they are classified into the folder of that program name. If not created yet, a new folder is created and they are classified into the new folder.

At Step S907, as exemplified in the first embodiment, the new printing contents are (finely) classified into the registered series or the new series on the basis of the CSS file. The new printing contents are classified into one of the folders for the individual series, as shown as a screen example in FIG. 28(c). The folder name is understandable if it contains the title element of the XHTML of the printing contents at the time when the series was newly registered. In the folders for fine classification, there are thumbnail images (or small images) of each of the printing contents, as shown as a screen example in FIG. 28(d). When a thumbnail image is selected, a preview image (or a large image) of the printing contents is displayed in the screen, as shown as a screen example in FIG. 28(e).

Figure 29:
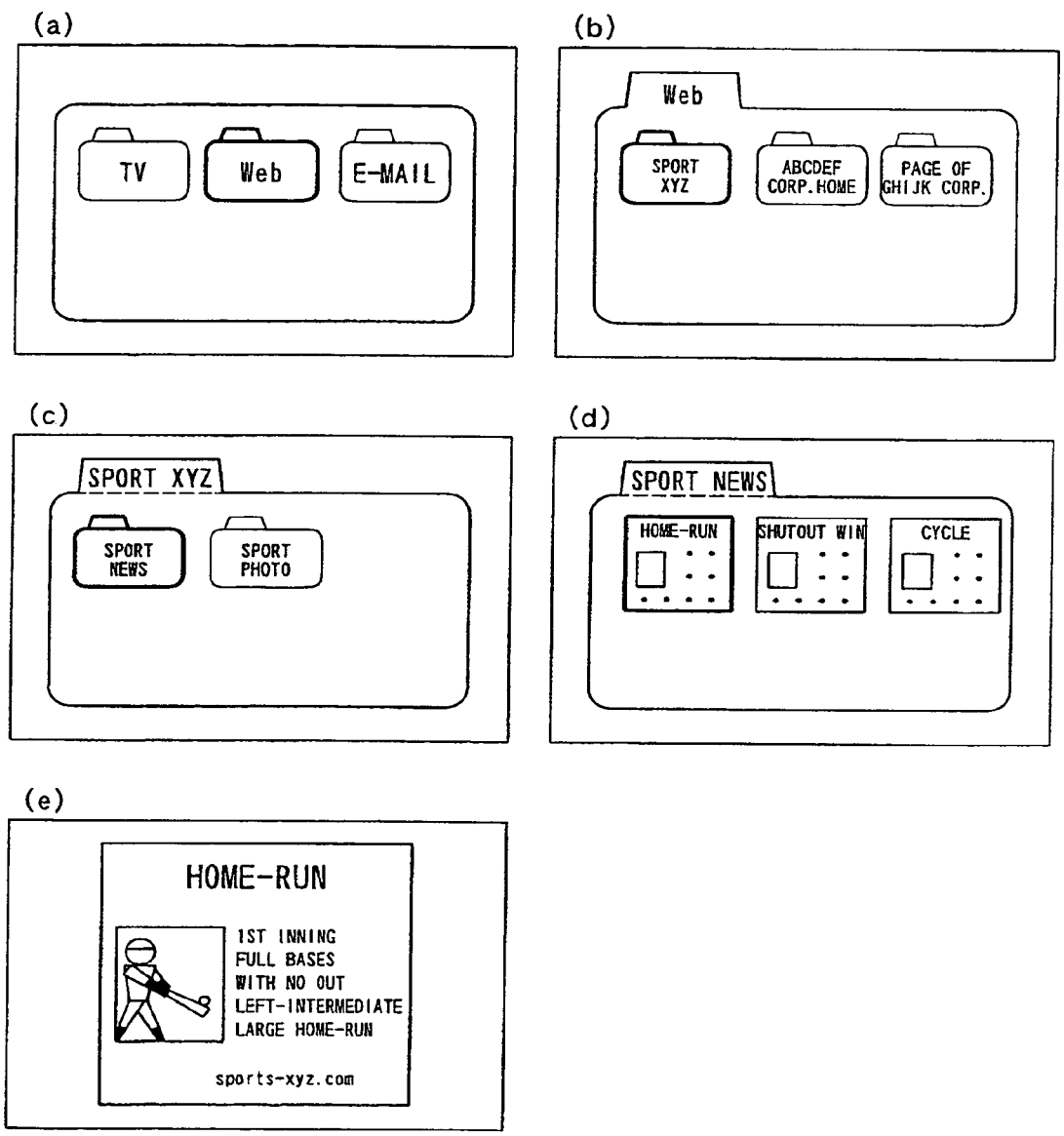
FIG. 29, including

In case the new printing contents are acquired from the Web, they are intermediately classified at Step S908 according to the domain. This domain is expressed by the characters from just after "http://" to just before the next "/" of the URL of the contents. In case the contents have the URL of "http://sports-xyz.com/baseball/index.html", for example, the portion "sports-xyz.com" expresses the domain. The new printing contents are classified into one of the folders of each domain, as shown as a screen example in FIG. 29(b).

The folder name may be a domain name itself, but it is more understandable if it uses the contents of the title element of the top page (index.html file) of the domain.

In case the title element of the "http://sports-xyz.com/index.html" is "<title>SPORTS-XYZ</title>", the folder name is "SPORTS-XYZ". If the folder of the domain is already created at the time when the new printing contents were acquired, they are classified into the folder of the domain. If not created yet, a new folder is created and they are classified into that new folder.

At Step S909, the new printing contents are (finely) classified into the registered series or the new series on the basis of the title element of the HTML file, as has been described in connection with the second embodiment. As shown as the screen example in FIG. 29(c), the printing contents are classified into one of the folders of each series. The folder name has the contents of the title element of the HTML of the printing contents at the time when the series was newly registered. In the folders for fine classification, there are thumbnail images (or small images) of each of the printing contents, as shown as a screen example in FIG. 29(d). When the thumbnail image is selected, a preview image (or a large image) of the printing contents is displayed in the screen, as shown as a screen example in FIG. 29(e).

In case the new printing contents are acquired from the E-mail, they are intermediately classified at Step S910 according to the E-mail address of the sender. The printing contents are classified into one of the folders of each mail address, as shown as a screen example in FIG. 30(b). The folder name may be a mail address itself, but it is more understandable if it uses the name of the sender added to the mail address. If the folder of the mail address is already created at the time when the new printing contents were acquired, they are classified into the folder of the mail address. If not created yet, a new folder is created and they are classified into that new folder.

At Step S911, the new printing contents are (finely) classified into the registered series or the new series on the basis whether or not the contents of the HTML file are identical except the image file name and the text to be actually displayed, as has been described in connection with the third embodiment. As shown as the screen example in FIG. 30(c), the printing contents are classified into one of the folders of each series. The folder name has the contents of the title element of the HTML of the printing contents at the time when the series was newly registered. In the folder for fine classification, there are thumbnail images (or small images) of each of the printing contents, as shown as a screen example in FIG. 30(d). When a thumbnail image is selected, a preview image (or a large image) of the printing contents is displayed in the screen, as shown as a screen example in FIG. 30(e).

According to this embodiment, as has been described hereinbefore, the plural printing contents having similar CSS files and XHTML files can be automatically classified into the same folders (series), so that the series printing contents can be arranged and displayed on the screen. As a result, the user can retrieve and peruse the printing contents with such a feel as looks at the album arranged for every series, on the screen.

Moreover, the printing contents are coarsely classified and then intermediately classified by the program name, the domain and the sender address, and only the printing data in the classifications are compared. Therefore, the printing contents, which are highly probably the same series, are coarsely classified so that the fine classifications can be determined more reliably. Furthermore, the printing data different in the coarse classification and the intermediate classification are not compared to make the process efficient.

Sixth Embodiment

In case the new printing contents are similar to the printing contents of the plural past series, the series are finally classified into one series in the aforementioned fourth embodiment by presenting the series in the order of higher similarities so that the user may select.

If, however, the printing contents of a series are classified and displayed in the screen as in the aforementioned fifth embodiment, one printing contents need not be classified into a single series but may be classified in an overlapping manner into a plurality of series. In short, the relating information relates the plural folders to one printing contents.

Figure 31:
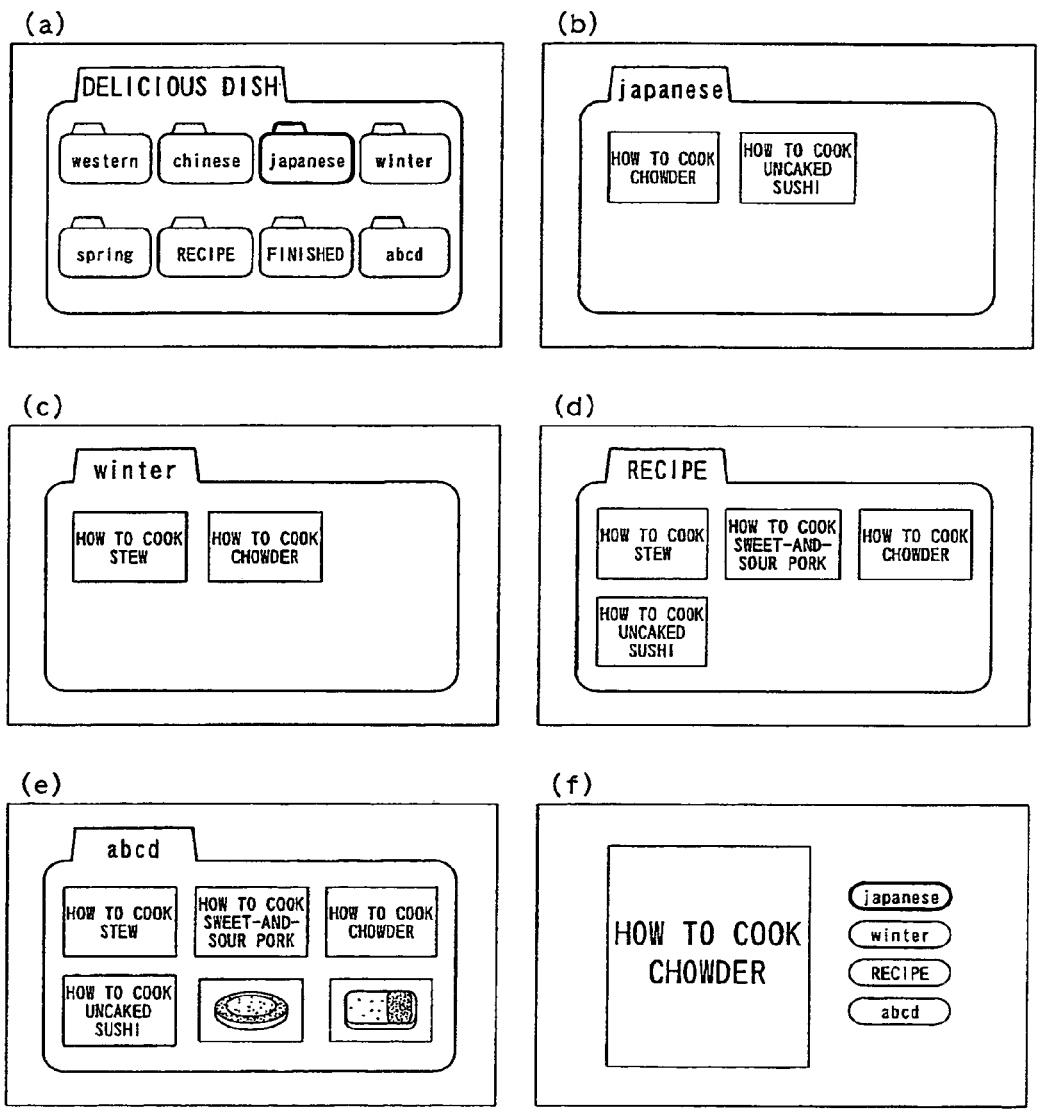
FIG. 31, including

In the screen of FIG. 31(a), there are eight series of "japanese", "chinese", "western", "winter", "spring", "recipe", "finished" and "abcd".

Of these series: the "japanese" expresses a Japanese dish; the "chinese" expresses a Chinese dish; and the "western" expresses a Western dish. The colors are varied according to their individual classifications. Moreover, the "winter" expresses a winter dish, and the "spring" expresses a spring dish. The colors are varied according to their individual classifications.

In the screen example of FIG. 31(b), the printing contents having the CSS file named "japanese.css" are classified into the series having the folder name of "japanese".

In the screen example of FIG. 31(c), the printing contents having the CSS file named "winter.css" are classified into the series having the folder name of "winter".

In the screen example of FIG. 31(d), the printing contents having the XHTML file containing a title element of "<title>recipe</title>" are classified into the series having the folder name of "recipe".

In the screen example of FIG. 31(e), the printing contents having the XHTML file containing an object element which contains the data attributes of "data="abcd.jpg"", are classified into the series having the folder name of "abcd".

FIGS. 31(b), (c), (d) and (e) show that the printing contents of "how to cook chowder" are classified in an overlapping manner into the series of "japanese", "winter", "recipe" and "abcd".

Figure 32:
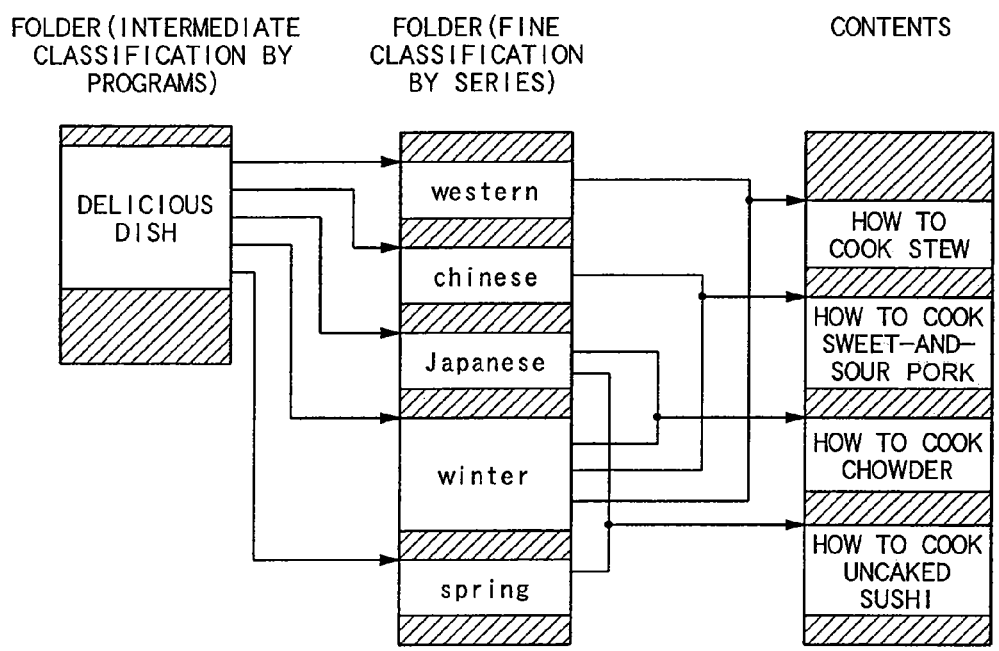
FIG. 32 is a memory map at the time when data on a program, data on series, and printing data are individually stored in folders.
Figure 33:
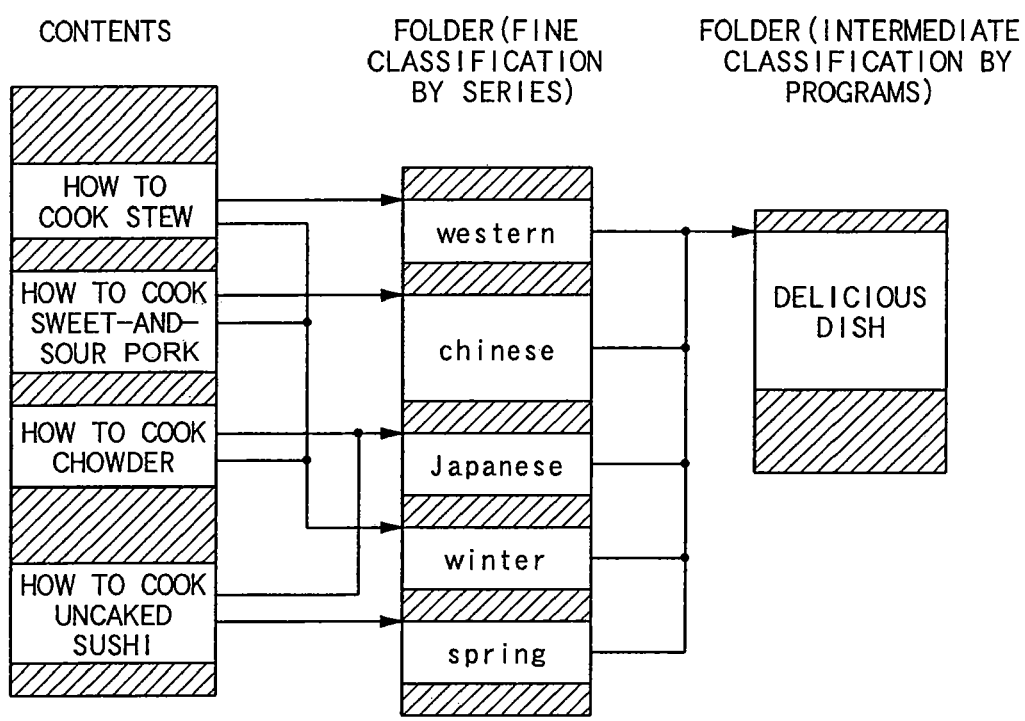
FIG. 33 is a memory map at the time when data on a program, data on series, and printing data are individually stored in folders.

The relating information indicating those classifications are stored in (or added to) the folders or the printing contents, or the management data for managing the former. FIG. 32 and FIG. 33 are examples of the memory map for storing the data on the programs, the data on the series, and the printing contents in the folders.

In the example of FIG. 32, the data on the programs have pointers for indicating the storage place of the data on the series, and the data on the series have pointers for indicating the storage place of the data on the printing contents.

In case the plural printing contents belonging to the series are batch-processed, this storage method is efficient because it can rapidly retrieve the corresponding printing contents.

In the example of FIG. 33, the data on the printing contents have pointers for indicating the storage place of the data on the series, and the data on the series contents have pointers for indicating the storage place of the data on the programs. This storage method is efficient in case the information of the plural series is applied to one printing contents.

In the storage areas of FIG. 32 and FIG. 33, there may be the individual entities of the program data, the series data and the printing data. In the storage areas of FIG. 32 and FIG. 33, alternatively, there may be only the management data on the program data, the series data and the printing data, and the entity of the data may be in the area which is indicated by the pointer contained in the management data.

Figure 34:
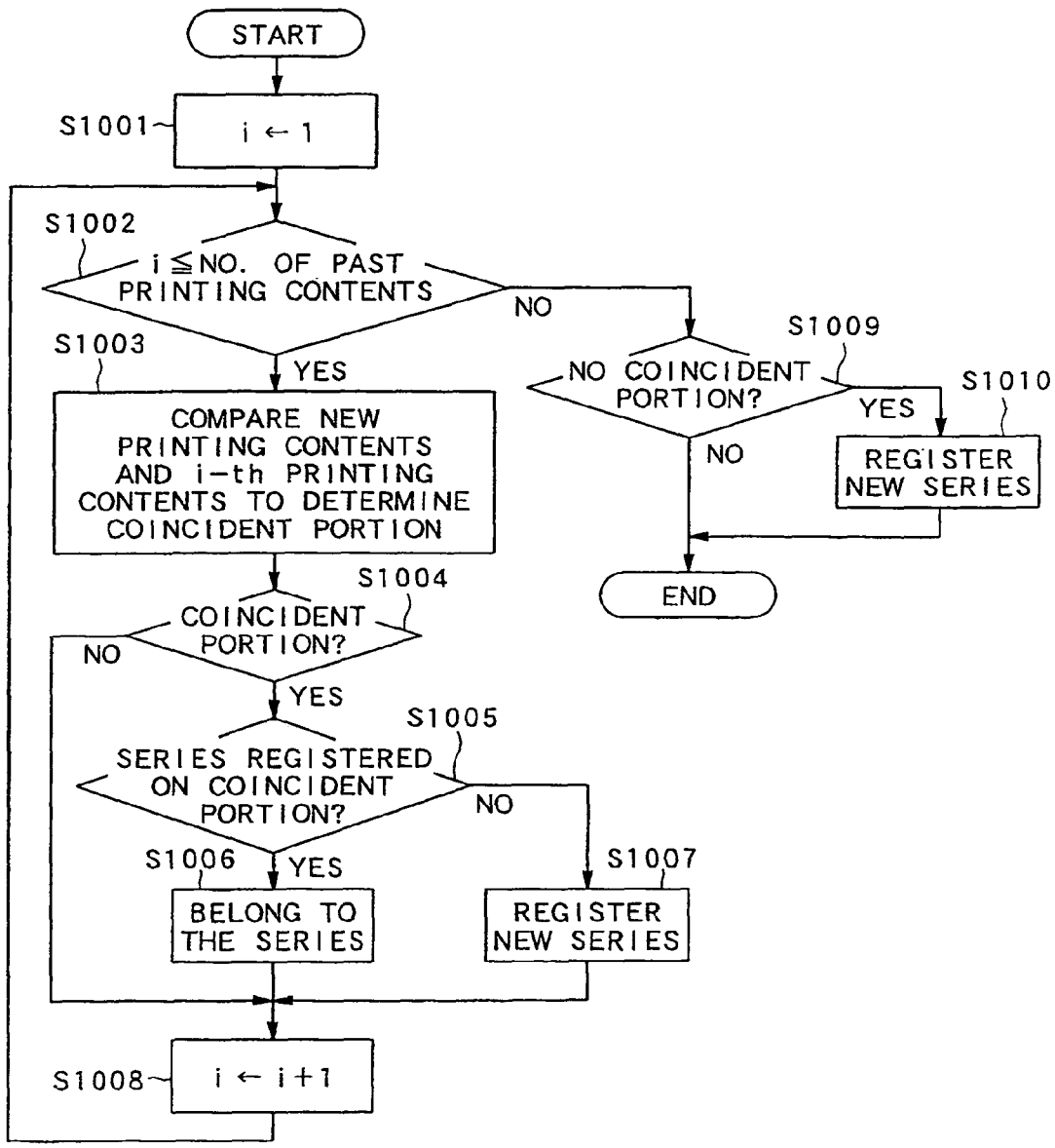
FIG. 34 is a flowchart showing the flows of classifying process in the sixth embodiment.

The method for classifying the printing contents into the plural series will be described in detail with reference to the flow chart of FIG. 34.

At Step S1001, the loop variable i for counting the past printing contents is initialized to 1.

If, at Step S1002, the loop variable i is less or equal to the number of the past printing contents, the routine advances to Step S1003, at which the i-th printing contents are processed.

At Step S1003, the new printing contents and the i-th printing contents are compared to determine the coincident portions on the basis of a predetermined method.

For example, it is compared whether or not the file name and the contents of a CSS file coincide, whether or not the title element of the XHTML file coincides, whether or not the file name of the image coincides, and whether or not the #PCDATA coincides.

If the coinciding portion is in the aforementioned comparisons at Step S1004, the routine advances to Step S1005. If not, the routine advances to Step S1008.

If the series based on the coinciding portion has already been registered at Step S1005, the routine advances to Step S1006, at which the new contents belong to that series. If the series based on the coinciding portion is not registered, the routine advances to Step S1007, at which the series based on the coinciding portion is newly registered, and it is determined that the new contents and the i-th printing contents belong to that series.

In case the file name and the contents of the CSS file coincide, for example, it is examined whether or not the series having that file name as the folder name has been registered. If not, the series having that file name as the folder name is newly registered.

In case the title element of the XHTML file coincides, for example, it is examined whether or not the series having the contents of that title element as the folder name has been registered. If not, the series having the contents of the title element as the folder name is newly registered.

In case the image file name coincides, for example, it is examined whether or not the series having that image file name as the folder name has been registered. If not, the series having that image file name as the folder name is newly registered.

At Step S1008, the loop variable i is incremented by 1, and the routine returns to Step S1002, at which the subsequent printing contents are processed.

When the loop process is repeated by the number of the past printing contents, the routine leaves the loop at Step S1002 and advances to Step S1009.

In case it is determined at Step S1009 that the determination of the coinciding portion is not made even once at Step S1004, the new contents do not belong to any series yet, and the routine advances to Step S1010, at which the new series is registered.

According to this embodiment, as has been described hereinbefore, one printing contents is classified in an overlapping manner into the plural relating series so that the printing contents can be classified and displayed in various modes according to the purposes. For the user, on the other hand, the desired contents can be retrieved with various pieces of information such as the sources of contents, the program name or the genre, so that the conveniences are improved.

Seventh Embodiment

In the seventh embodiment of the invention, the printing contents are classified into the series on the basis of the series identifier (series_id), which is Contained in the SI (Service Information: program-array information) of the TV program providing the printing contents.

The series identifier is an identifier of 16 bits, which is contained in a series descriptor having the data structure of FIG. 35. The series descriptor is contained in the EIT (Event Information Table), which is one of the tables constituting the SI. If the values of 16 bits of the series identifier contained in the SI of two programs coincide, it can be determined that the two programs are series programs. A series program means a program that is repeatedly broadcasted regularly (everyday, every week or every month) or irregularly. In the series programs, the printing contents of the same format may be provided every time, as presented at (I), (III) and (V) in FIG. 12.

The SI is the data, which can be used in the EPG (Electronic Program Guide), and the data analyzing unit of the SI is basically built in the digital TV receiver. This embodiment utilizes the data analyzing unit for the EPG. This results in the merit that another data analyzing unit need not be added so as to practice the invention.

Figure 36:
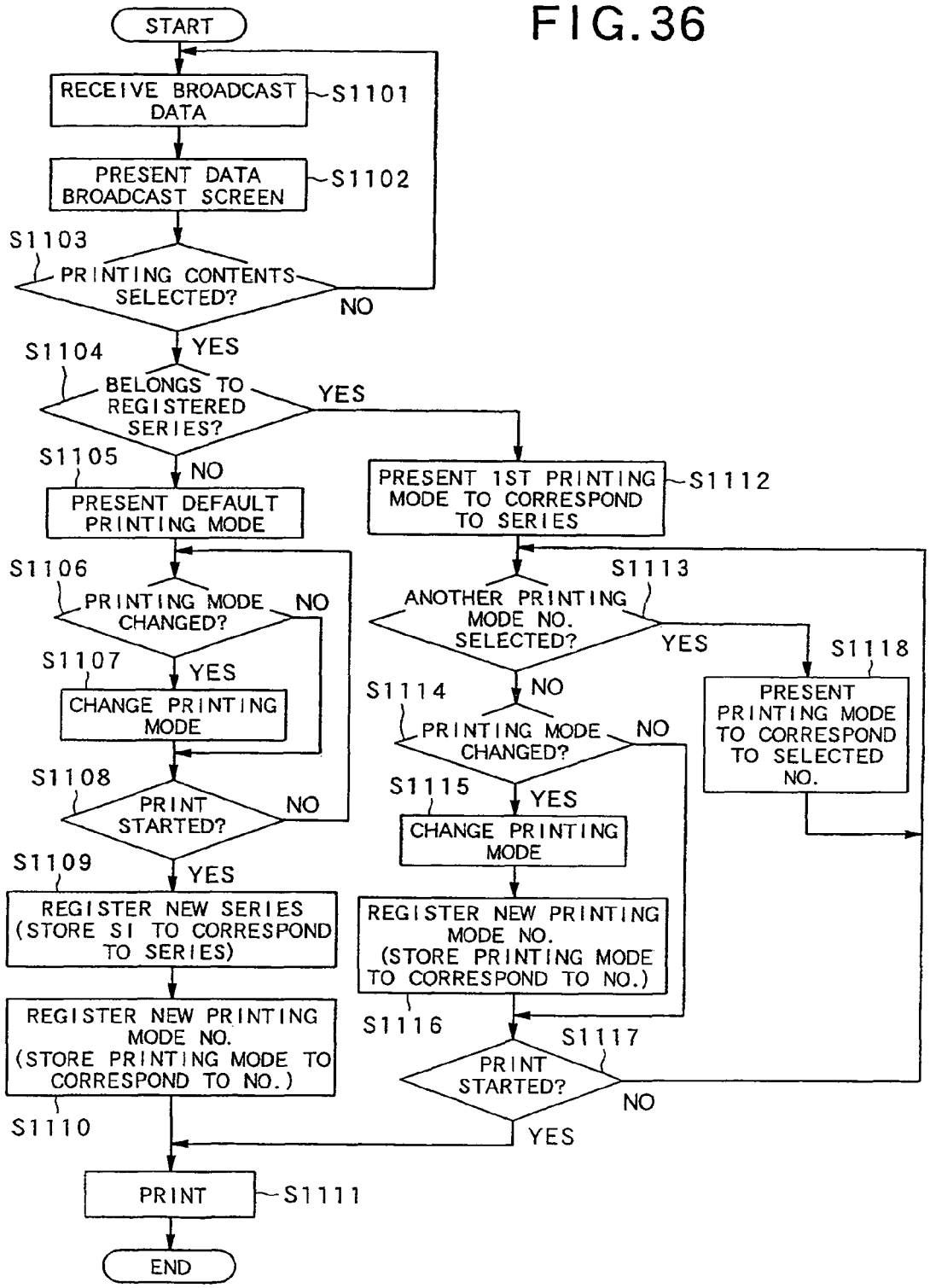
FIG. 36 is a flow chart showing the flows of a print processing system in the seventh embodiment.

The process flow in the seventh embodiment will be described with reference to the flow chart of FIG. 36.

The operations from Step S1101 to Step S1103 are similar to those of Step S101 to Step S103 of the flow chart of FIG. 7, which has already been described.

At Step S1104, the printing mode setting unit 24 determines whether or not the printing contents newly inputted at this time belong to the registered series, on the basis of the past printing history data stored in the printing history storing unit 23. Here in this embodiment, the determination is made by using the series identifier (series_id) contained in the SI. The detailed determination method will be described hereinafter. If the printing contents belong to the registered series, the routine advances to Step S1112. If the printing contents do not belong to any of the registered series, the routine advances to Step S1105. At first, no series is registered, it is determined that the printing contents do not belong to the registered series, and the routine advances to Step S1105.

The operations from Step S1106 to Step S1108 are similar to those of Step S106 to Step S108 of the flowchart of FIG. 7.

At Step S1109, the new series is created/registered as the series, to which the printing contents at this time belong, and the program information (i.e., the series identifier in the SI information in this embodiment) at this time is stored corresponding to the series.

In one series programs, printing contents of different formats may be provided as at (II) and (III) of FIG. 12. In this embodiment, therefore, the plural printing modes can be registered in one series, and the individual printing modes are managed in the serial numbers. At Step S1110, the number (No. 1 at first) of the printing mode in the series programs is registered, and the individual set values of the printing modes are stored corresponding to that number.

At Step S1111, the printing process is performed as at Step S110 of the flow chart of FIG. 7.

If the printing contents belong to the registered series at Step S1105, the printing mode corresponding to No. 1 of that series is presented at Step S1112.

In case the user selects a printing mode number other than the aforementioned presented number at Step S1113, the routine advances to Step S1118, at which the printing mode corresponding to the selected number is presented.

If the printing mode changing operation by the user is performed at Step S1114, the routine advances to Step S1115, at which the set value of the printing mode is changed. The routine further advances to Step S1116, at which the new number of that series is registered and corresponding to that number the individual set values of the printing mode which have been changed is stored.

If it is decided at Step S1117 that the print starting operation is performed, the routine advances to Step S1111, at which the printing processing is performed.

FIG. 37 shows the operation screen of the case, in which for the printing contents of a new series program the default printing mode is presented so that the user prints without change. If the user confirms the printing mode and needs no change, the user pushes the decision key without change. Then, a printing mode corresponding to the new number (No. 1) is set.

Figure 38:
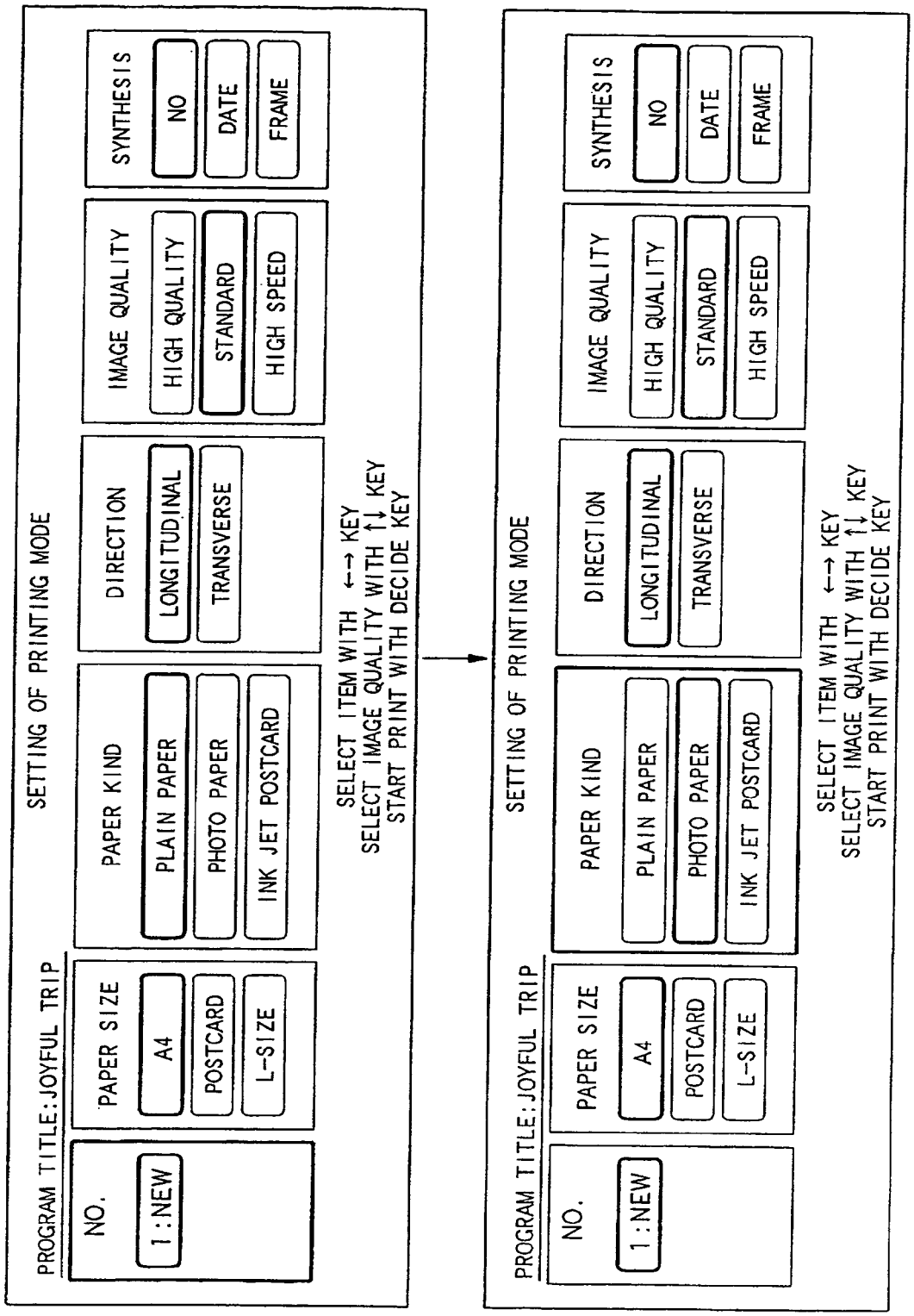
FIG. 38 presents a printing mode setting screen.

FIG. 38 shows the operation screen of the case, in which for the printing contents of a new series program the default printing mode is presented so that the user changes the printing mode and prints. When the user operates the arrow key to change the printing mode and pushes the decision key, the printing mode corresponding to the new number (No. 1) is set.

FIG. 39 shows the operation screen of the case, in which for the printing contents of a registered series program the No. 1 printing mode of that series is presented so that the user prints without change. If the user confirms the printing mode and needs no change, the user pushes the decision key without change. Then, a printing mode corresponding to that number (No. 1) is set.

Figure 40:
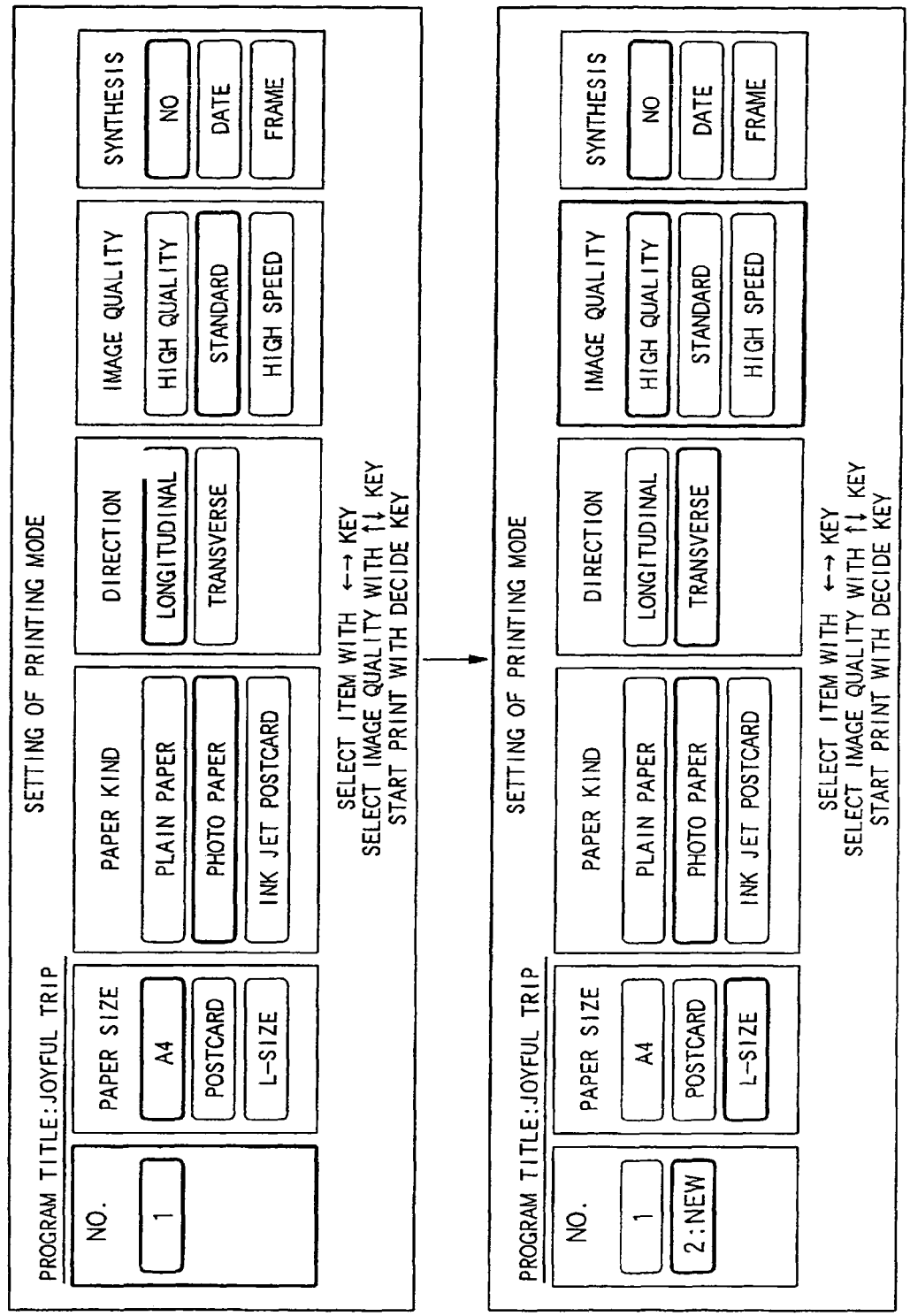
FIG. 40 presents a printing mode setting screen.

FIG. 40 shows the operation screen of the case, in which for the printing contents of a registered series program the No. 1 printing mode of that series is presented so that the user changes the printing mode and prints. When the user operates the arrow key to change the printing mode, a new number (No. 2) is newly presented. When the user pushes the decision key, the printing mode corresponding to the new number (No. 2) is set.

Figure 41:
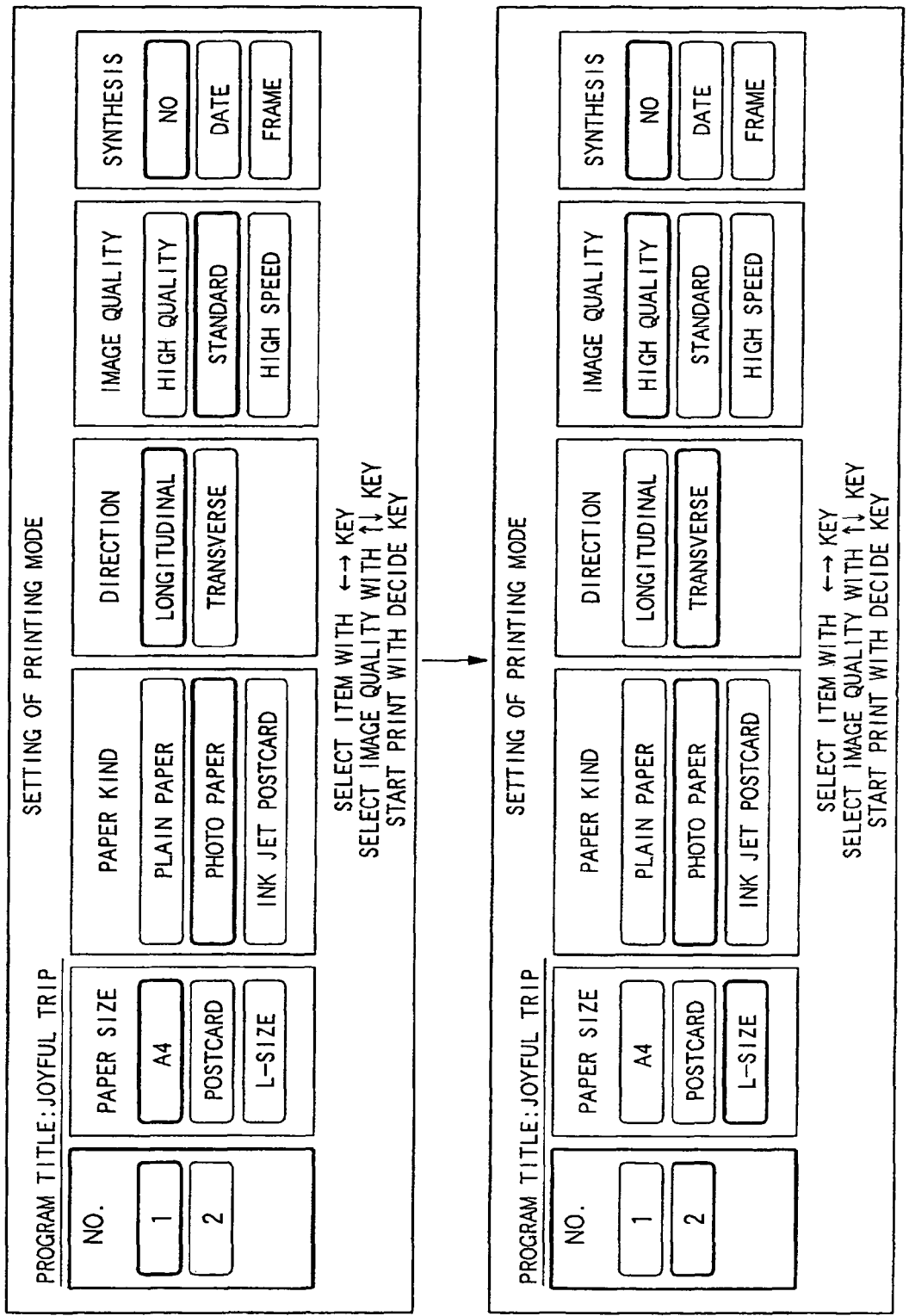
FIG. 41 presents a printing mode setting screen.

FIG. 41 shows the operation screen of the case, in which for the printing contents of a registered series program the No. 1 printing mode of that series is presented so that the user selects another number and prints. When the user operates the arrow key to select the button of the printing mode No. 2, the printing mode corresponding to that number (No. 2) is presented. If the user confirms the printing mode and needs no change, the user pushes the decision key without change. Then, a printing mode corresponding to the new number (No. 2) is set.

In the actual use, it is thought that only the printing contents of the format of one kind is mostly provided for one series program. In case the printing contents of the formats of plural kinds are provided for one series program, alternatively, it is thought that the user mostly selects only the printing contents of the format of one kind and prints them. In these cases, in the second and subsequent time of printing the series programs, what is required for the user is to confirm the printing mode presented and to push the decision key without change, as shown in FIG. 39, so that the operations are simplified.

(Similarity Deciding Processing)

The method at Step S1104 for determining whether or not the printing contents at this time belong to the registered series will be described in detail with reference to the flow chart of FIG. 42.

At Step S1201, the loop variable n for counting the series is initialized to 1.

If the loop variable n is less or equals to the number of the registered series at Step S1202, the routine advances to Step S1203, at which the processing of the n-th series is performed.

At Step S1203, the series identifier of the SI of the program for providing the new printing contents and the series identifier of the SI of the program for providing the printing contents corresponding to the n-th series are compared. If these series identifiers coincide, the routine advances to Step S1204, at which it is determined that the new printing contents belong to the n-th series, and the routine is ended.

If not, the routine advances to Step S1205, at which the loop variable n is incremented by 1, and the routine returns to Step S1202, at which the processing for the next series is performed.

If the series identifiers do not coincide even if the loop process is repeated by the number of the registered series, the routine advances at Step S1202 through the loop to Step S1206, at which it is determined that the new printing contents do not belong to any of the registered series, and the routine is ended.

Here, the aforementioned series descriptor is arbitrarily sent according to the standard specifications of the ARIB (Association of Radio Industries and Businesses). In the program for transmitting no series descriptor, therefore, the series program may be estimated from another piece of information contained in the SI.

Figure 42:
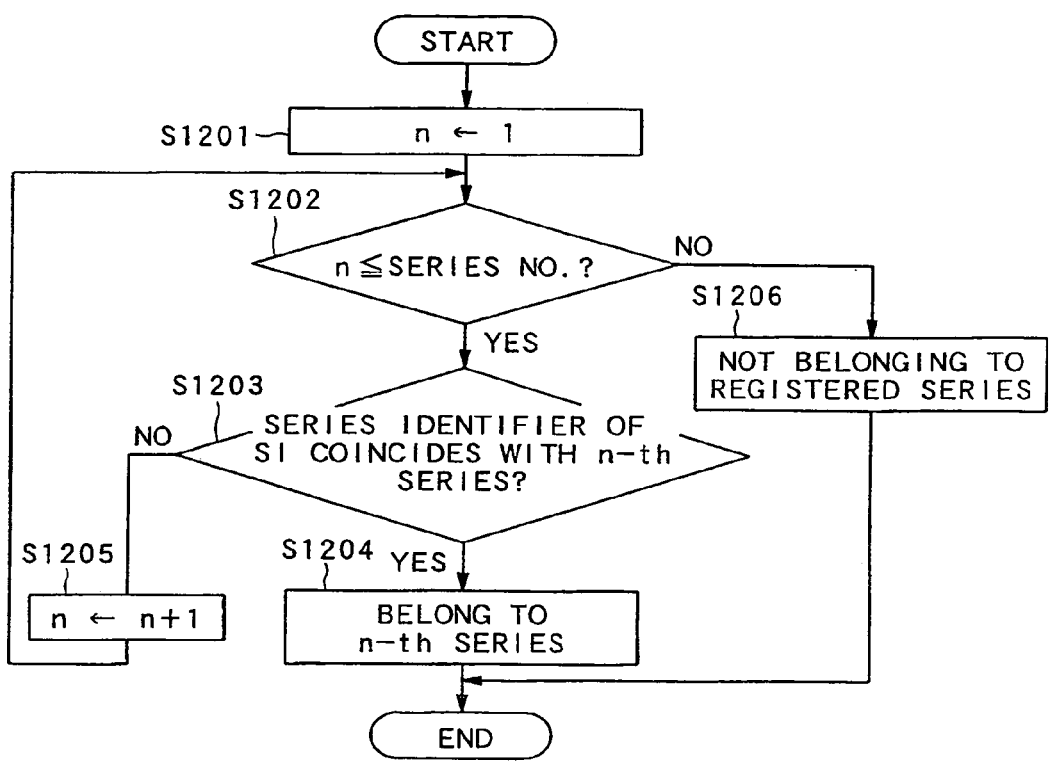
FIG. 42 is a flow chart showing the flows of a series determination process in the seventh embodiment.

In case it is determined at Step S1203 of FIG. 42 that the series identifier is not in the SI of the program for providing the new printing contents, for example, the program (event) names (of character strings) contained in the short event descriptor having the data structure of FIG. 43 are compared. If the program names coincide, it can be estimated that the program is of a series. In the standard specifications of the ARIB, it is essential to transmit the short event descriptor.

As a more convenient method, the series program can be estimated practically sufficiently even by comparing not the series identifier but only the program name contained in the short event descriptor.

According to this embodiment, as has been described hereinbefore, the series can be classified with the simple configuration by diverting the SI data analyzing unit which is basically provided in the digital TV receiver.

This application claims priority from Japanese Patent Applications Nos. 2004-27809 filed on Feb. 4, 2004 and 2005-018117 filed on Jan. 26, 2005, which are hereby incorporated by reference herein.

What is claimed is:

1. A broadcast receiving apparatus which receives a digital broadcast wave, and communicates with a printer to print out printing contents contained in the received digital broadcast wave, the apparatus comprising:
a receiving unit for receiving the digital broadcast wave;
a detection unit for detecting series information indicating that a broadcasting program is in a predetermined series program, and
program name information, from the digital broadcast wave received by the receiving unit;
a selection unit for selecting the printing contents broadcast in association with the broadcasting program in accordance with a selecting instruction by a user to obtain the selected printing contents from the digital broadcast wave received by the receiving unit;
a setting unit for setting a printing condition, for printing of the printing contents selected by the selection unit, the printing condition including values of paper size, paper kind, direction and image quality;
a print processing unit for processing the printing contents selected by the selection unit in accordance with the printing condition set by the setting unit to generate printing data to be transmitted to the printer; and
a storing unit for storing, (i) the printing condition set by the setting unit, used for processing the printing contents selected by the selection unit, and (ii) the series information and the program name information of the broadcast program corresponding to the selected printing contents,
wherein at the time of printing new printing contents obtained anew, (a) the setting unit obtains from the detection unit the series information and the program name information of the broadcasting program which corresponds to the new printing contents, (b) the setting unit determines whether one of the obtained series information or program name information matches a respective one of the series information or the program name information corresponding to the printing condition stored in the storing unit, and (c) if determined that the obtained series information or program name information matches the series information or program name information corresponding to the printing condition stored in the storing unit, an operation screen is displayed, which enables a user to select whether the printing condition stored in the storing unit will be used for processing the new printing contents by the print processing unit.

2. A control method for a broadcast receiving apparatus, wherein the broadcast receiving apparatus receives a digital broadcast wave, communicates with a printer to print out printing contents contained in the received digital broadcast wave, and includes a storing unit for storing information, the method comprising:

a receiving step for receiving the digital broadcast wave;

a detection step for detecting series information indicating that a broadcasting program is in a predetermined series program, and program name information, from the digital broadcast wave received in the receiving step;

a selection step for selecting the printing contents broadcast in association with the broadcasting program in accordance with a selecting instruction by a user to obtain the selected printing contents from the digital broadcast wave received in the receiving step;

a setting step for setting a printing condition, for printing of the printing contents selected in the selection step, the printing condition including values of paper size, paper kind, direction and image quality;

a print processing step for processing the printing contents selected in the selection step in accordance with the printing condition set in the setting step to generate printing data to be transmitted to the printer; and a storing step for storing (i) the printing condition set in the setting step used for processing the printing contents selected in the selection step, and (ii) the series information and the program name information of the broadcast program corresponding to the selected printing contents in the storing unit, wherein at the time of printing new printing contents obtained anew, (a) the setting step determines whether one of the series information or the program name information of the broadcasting program which corresponds to the new printing contents obtained in the detection step matches a respective one of the series information or the program name information corresponding to the printing condition stored in the storing unit in the storing step, and (b) if determined that the obtained series information or program name information matches the series information or program name information corresponding to the printing condition stored in the storing unit, an operation screen is displayed, which enables a user to select whether the printing condition stored in the storing unit will be used for processing the new printing contents in the print processing step.

* * * * *